United States Patent
Yamashita et al.

(10) Patent No.: US 10,639,546 B2
(45) Date of Patent: May 5, 2020

(54) VIBRATION CONTROL SYSTEM, VIBRATION CONTROL APPARATUS, STORAGE MEDIUM AND VIBRATION CONTROL METHOD

(71) Applicant: NINTENDO CO., LTD., Kyoto (JP)

(72) Inventors: Kei Yamashita, Kyoto (JP); Takafumi Aoki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 109 days.

(21) Appl. No.: 15/867,785

(22) Filed: Jan. 11, 2018

(65) Prior Publication Data

US 2018/0200620 A1    Jul. 19, 2018

(30) Foreign Application Priority Data

Jan. 13, 2017    (JP) .................................. 2017-003757

(51) Int. Cl.
*A63F 13/285*    (2014.01)
*A63F 13/92*    (2014.01)
(Continued)

(52) U.S. Cl.
CPC .......... *A63F 13/285* (2014.09); *A63F 13/235* (2014.09); *A63F 13/24* (2014.09);
(Continued)

(58) Field of Classification Search
CPC .......... A63F 13/57; A63F 13/24; A63F 13/50; A63F 13/285; A63F 13/235; A63F 13/92
(Continued)

(56) References Cited

U.S. PATENT DOCUMENTS

| 2006/0038833 A1* | 2/2006 | Mallinson ............... A63F 13/02 |
| | | 345/633 |
| 2006/0046843 A1 | 3/2006 | Nakajima |

(Continued)

FOREIGN PATENT DOCUMENTS

| EP | 3 088 064 A1 | 11/2016 |
| JP | 2006-68210 | 3/2006 |

OTHER PUBLICATIONS

Extended European Search Report dated Mar. 21, 2018 issued in European Application No. 18151335.9 (9 pgs.).

*Primary Examiner* — Michael A Cuff
(74) *Attorney, Agent, or Firm* — Nixon & Vanderhye, P.C.

(57) ABSTRACT

A non-limiting example game apparatus comprises a main body apparatus functions as a vibration control apparatus and a first controller and a second controller that are attachable to or detachable from the main body apparatus. For example, the game apparatus is used in a first mode that two controller are attached to the main body apparatus, a second mode that the two controllers are detached from the main body apparatus and used independently, a third mode that the two controllers are detached from the main body apparatus and used with being connected integrally to each other, or a fourth mode that a third controller different from the two controllers is used. A vibration source and a reception portion of the vibration are set in a virtual space, and vibration generated from the vibration source is conveyed to the reception portion with being attenuated according to a situation in the virtual space. Attenuated vibration is generated in a vibration portion of the first or third controller, and attenuated vibration is generated in a vibration portion of the second or third controller.

16 Claims, 21 Drawing Sheets

(51) Int. Cl.
  *A63F 13/235* (2014.01)
  *A63F 13/50* (2014.01)
  *A63F 13/24* (2014.01)
  *A63F 13/57* (2014.01)
(52) U.S. Cl.
  CPC .............. *A63F 13/50* (2014.09); *A63F 13/57* (2014.09); *A63F 13/92* (2014.09)
(58) Field of Classification Search
  USPC .......................................................... 463/30
  See application file for complete search history.

(56) References Cited

U.S. PATENT DOCUMENTS

| | | | |
|---|---|---|---|
| 2006/0125771 A1* | 6/2006 | Inuzuka | G09G 3/2096 345/102 |
| 2008/0204266 A1* | 8/2008 | Malmberg | G06F 3/016 340/683 |
| 2009/0085878 A1* | 4/2009 | Heubel | G06F 3/016 345/173 |
| 2009/0315898 A1* | 12/2009 | Cailliere | G06T 9/001 345/473 |
| 2010/0022303 A1 | 1/2010 | Nakajima | |
| 2013/0038603 A1 | 2/2013 | Bae | |
| 2013/0207792 A1* | 8/2013 | Lim | G06F 3/011 340/407.1 |
| 2013/0244783 A1 | 9/2013 | Nakajima | |
| 2015/0209668 A1* | 7/2015 | Obana | G06F 3/011 463/31 |
| 2015/0356838 A1* | 12/2015 | Obana | G06F 3/016 340/407.1 |

* cited by examiner

FIG. 6   FIRST MODE
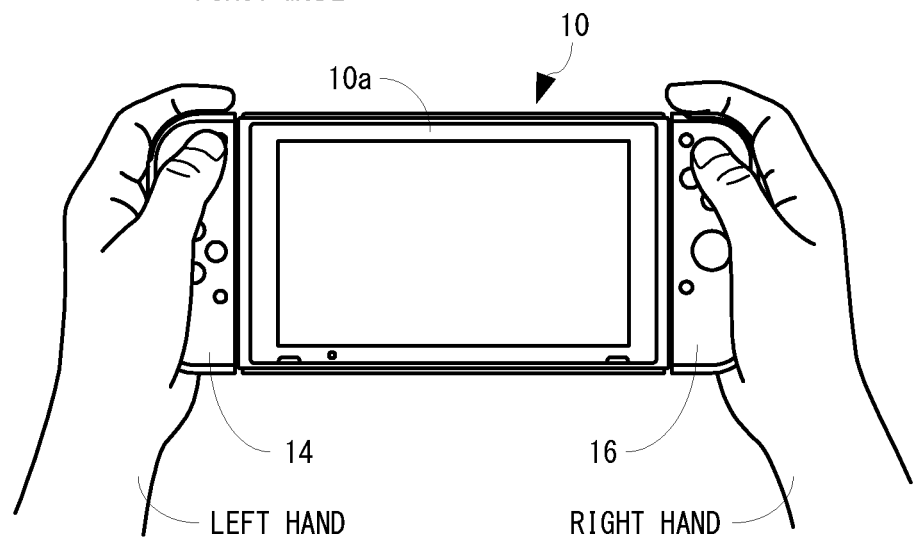
FIG. 7   SECOND MODE
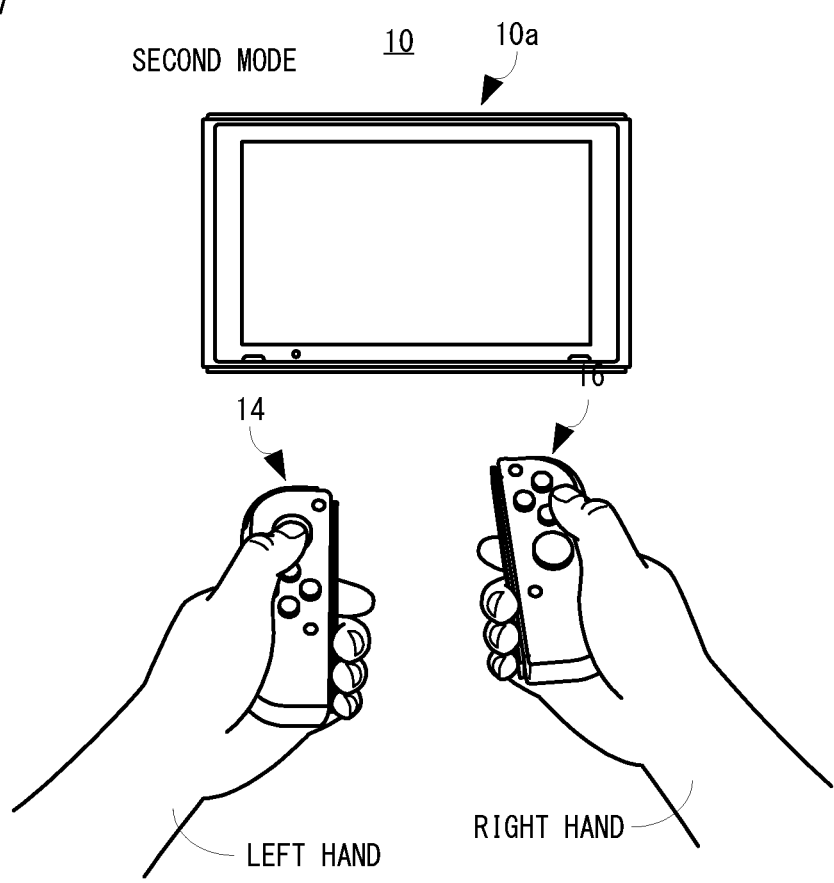

FIG. 8
THIRD MODE
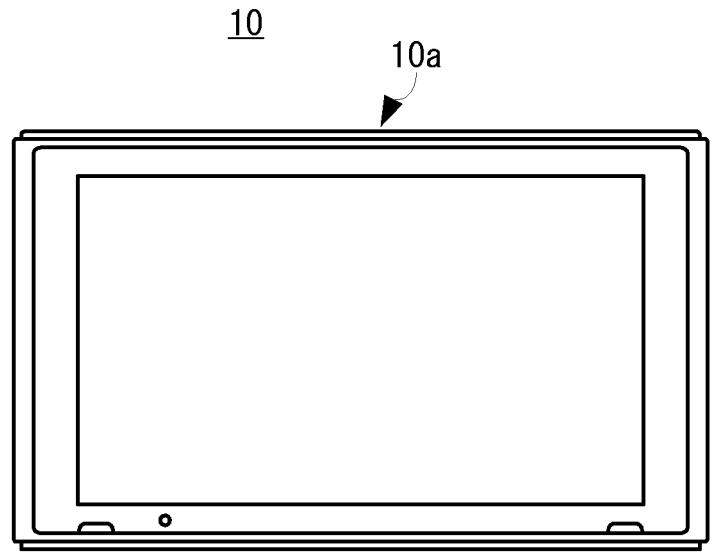
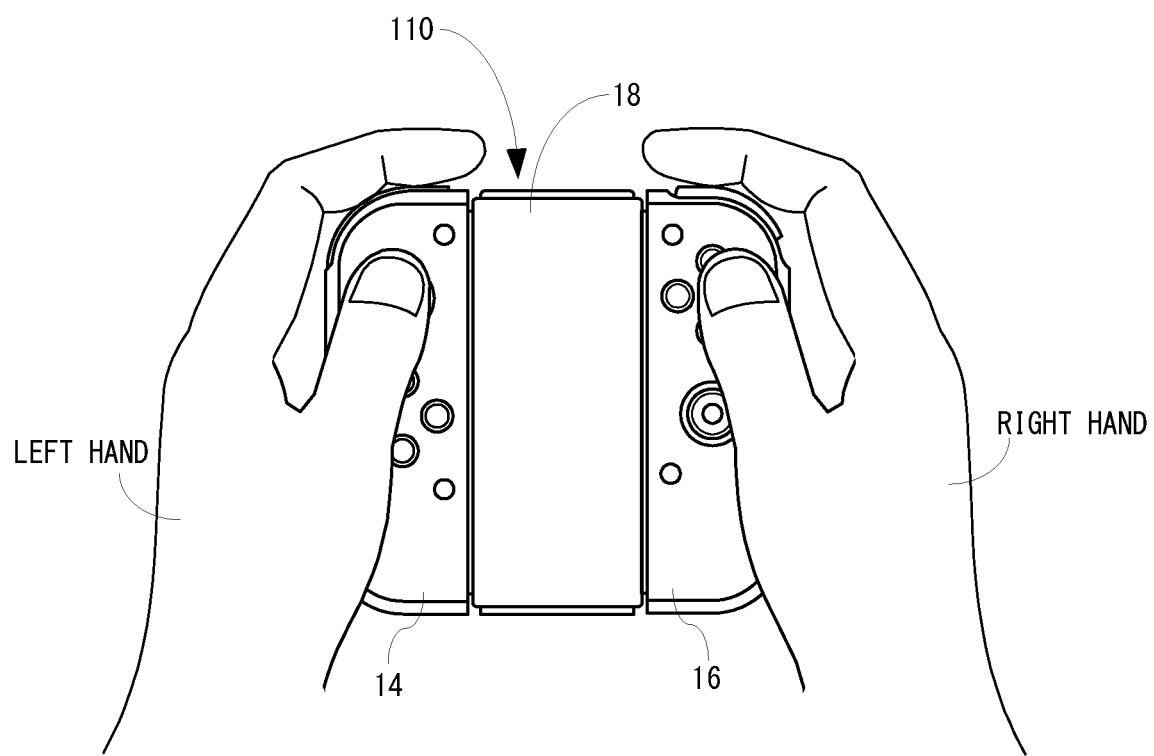

FIG. 9
FOURTH MODE
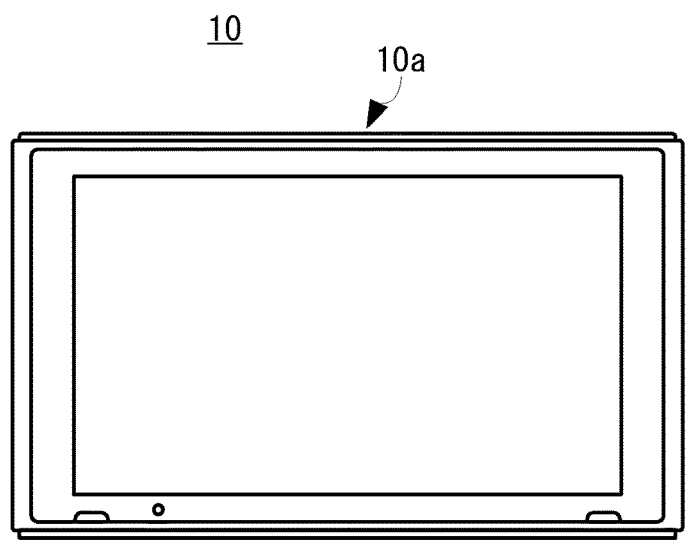
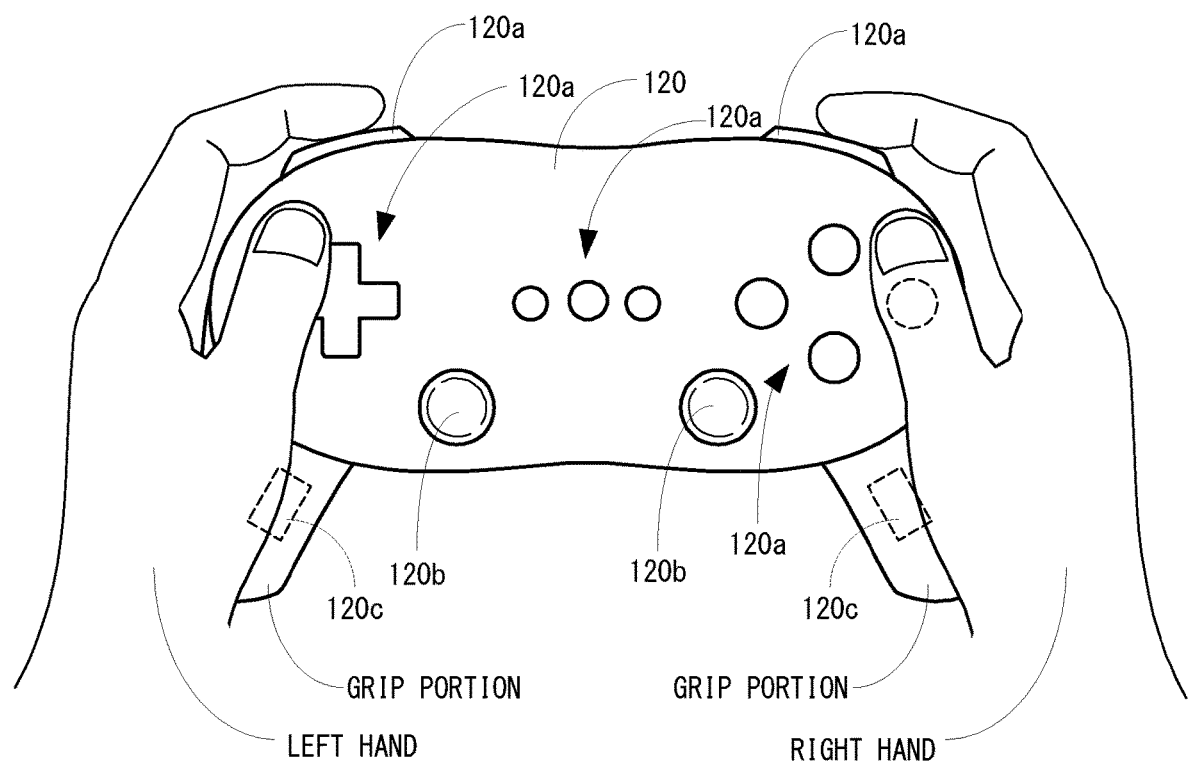

VIBRATION CONTROL SYSTEM, VIBRATION CONTROL APPARATUS, STORAGE MEDIUM AND VIBRATION CONTROL METHOD

CROSS REFERENCE OF RELATED APPLICATION

The disclosure of Japanese patent application No. 2017-3757 filed on Jan. 13, 2017 is incorporated by reference.

FIELD

This application describes a vibration control system, vibration control apparatus, storage medium and vibration control method, controlling vibration of a device provided with a vibration motor.

SUMMARY

It is a primary object of an embodiment(s) to provide a novel vibration control system, vibration control apparatus, storage medium and vibration control method.

Moreover, it is another object of the embodiment(s) to provide a vibration control system, vibration control apparatus, storage medium and vibration control method, capable of presenting vibration according to various situations in a virtual space.

A first embodiment is a vibration control system, comprising: a vibration source arrangement portion; a vibration data generation portion; a reception portion setting portion; a changing portion; and a vibration control portion. The vibration source arrangement portion is configured to arrange a vibration source in a virtual space. The vibration data generation portion is configured to generate vibration data corresponding to vibration that is generated from the vibration source. The reception portion setting portion is configured to set in the virtual space a reception portion configured to receive the vibration from the vibration source. The changing portion is configured to change the vibration data that is generated by the vibration data generation portion based on a space situation between the vibration source that is arranged by the vibration source arrangement portion and the reception portion that is set by the reception portion setting portion. The vibration control portion is configured to make a vibration portion vibrate according to the vibration data that is changed by the changing portion.

According to the first embodiment, the reception portion that receives the vibration is set in the virtual space, and the vibration portion is made to vibrate while changing the vibration data corresponding to the vibration that is generated by the vibration source based on the apace situation between the vibration source and the reception portion, and therefore, it is possible to present vibration according to various situations in the virtual space.

A second embodiment is the vibration control system according to the first embodiment, wherein the vibration source corresponds to a first object that is arranged in the virtual space.

A third embodiment is the vibration control system according to the first embodiment, further comprising a player object arrangement portion. The player object arrangement portion is configured to arrange in the virtual space a player object that is moved in the virtual space according to an operation of a player. The reception portion setting portion is configured to set the reception portion in relation to the player object that is arranged by the player object arrangement portion.

According to the third embodiment, since the reception portion is set in relation to the player object that is arranged in the virtual space, it is possible to make a player perceive the vibration conveyed to the player object.

A fourth embodiment is the vibration control system according to the first embodiment, wherein the vibration source arrangement portion is configured to arrange a plurality of vibration sources in the virtual space. The vibration data generation portion is configured to generate the vibration data corresponding to the vibration that is generated from each of the plurality of vibration sources. The changing portion is configured to change each vibration data based on the space situation between each of the plurality of vibration sources and the reception portion. A synthesizing portion is configured to synthesize each changed vibration data with each other. The vibration control portion is configured to make the vibration portion based on the vibration data that is synthesized by the synthesizing portion.

According to the fourth embodiment, even when vibration is generated from each of the plurality of vibration sources, it is possible to present the vibration according to various situations in the virtual space.

A fifth embodiment is the vibration control system according to the first embodiment, further comprising two vibration portions. The two vibration portions are configured to be arranged on left and right when in use. The reception portion setting portion is configured to set the two reception portions in the virtual space corresponding to the two vibration portions, respectively. The changing portion is configured to generate first changed vibration data obtained by changing the vibration data that is generated by the vibration data generation portion based on the space situation between the vibration source and one of the two reception portions, and generate second changed vibration data obtained by changing the vibration data that is generated by the vibration data generation portion based on the space situation between the vibration source and the other of the two reception portions. The vibration control portion is configured to make one of the two vibration portions vibrate according to the first changed vibration data, and the other of the two vibration portions vibrate according to the second changed vibration data.

According to the fifth embodiment, since the two reception portions are provided corresponding to the two vibration portions and the vibration data for each reception portion is changed based on the space situation, it is possible to present a stereo feeling by the vibration.

A sixth embodiment is the vibration control system according to the fifth embodiment, wherein the two reception portions are arranged corresponding to left and right of a second object.

According to the sixth embodiment, the reception portion can be arranged in relation to an object other than the player object.

A seventh embodiment is the vibration control system according to the sixth embodiment, wherein the second object is a virtual camera.

According to the seventh embodiment, it is possible to make the player perceive the vibration conveyed to the player object that is arranged in a position of the virtual camera or a virtual player.

An eighth embodiment is the vibration control system according to the sixth embodiment, wherein the second object is a virtual player. The reception portion setting portion is configured to set a further reception portion other than the two reception portions on the virtual player. The changing portion is configured to further change the vibration data having been changed based on the space situation between the vibration source and the reception portion based on a space situation between the reception portion and the further reception portion.

According to the eighth embodiment, since the vibration data corresponding to the vibration conveyed to the reception portion from the vibration source is changed and the vibration data corresponding to the vibration conveyed to the further reception portion from the reception portion is also changed, for example, it is possible to make the player feel impression that the player himself/herself is operating the player object in the virtual space while expressing the vibration that is felt by the player object.

A ninth embodiment is the vibration control system according to the fifth embodiment, wherein the changing portion is configured to change the vibration data so that a difference between the vibration that is received by one of the two reception portions and the vibration that is received by the other of the two reception portions becomes large.

According to the ninth embodiment, since the difference of the vibration that are generated by the two vibration portions can be made large, it is possible to obtain a stereo feeling even when the two vibration portions are provided in an apparatus constituted by a single housing or an apparatus that a plurality of housings are integrated.

A tenth embodiment is the vibration control system according to the first embodiment, wherein the space situation includes a medium between the vibration source and the reception portion, and the changing portion is configured to change a changing rate of the vibration data according to the medium.

According to the tenth embodiment, it is possible to convey the vibration in the virtual space as similar to a case where vibration is conveyed in the real world.

An eleventh embodiment is the vibration control system according to the first embodiment, wherein the vibration data is data about a set of values of a frequency and an amplitude of a vibration waveform. The changing portion is configured to change at least one of the frequency and the amplitude according to a space situation.

According to the eleventh embodiment, it is possible to change the vibration received by the reception portion by changing at least one of the frequency and the amplitude of the vibration waveform.

A twelfth embodiment is the vibration control system according to the eleventh embodiment, wherein the changing portion is configured to change a changing rate of the amplitude according to a frequency. For example, when the frequency is high, an amount for attenuating the vibration (attenuation rate) is set to be larger than that of the time when the frequency is low.

A thirteenth embodiment is the vibration control system according to the third embodiment, wherein the changing portion is configured to change the vibration data according to a state of the player object.

According to the thirteenth embodiment, since the vibration data can also be changed according to the state of the player object, it is possible to present the vibration according to the various situations in the virtual space.

A fourteenth embodiment is the vibration control system according to the third embodiment, wherein the changing portion is configured to change a changing rate of the vibration data according to a state of the player object.

According to the fourteenth embodiment, since the changing rate can be changed according to the state of the player object, it is possible to present the vibration according to the various situations in the virtual space.

A fifteenth embodiment is a vibration control apparatus, comprising: a vibration source arrangement portion; a vibration data generation portion; a reception portion setting portion; a changing portion; and a vibration control portion. The vibration source arrangement portion is configured to arrange a vibration source in a virtual space. The vibration data generation portion is configured to generate vibration data corresponding to vibration that is generated from the vibration source. The reception portion setting portion is configured to set in the virtual space a reception portion configured to receive the vibration from the vibration source. The changing portion is configured to change the vibration data that is generated by the vibration data generation portion based on a space situation between the vibration source that is arranged by the vibration source arrangement portion and the reception portion that is set by the reception portion setting portion. The vibration control portion is configured to make a vibration portion vibrate according to the vibration data that is changed by the changing portion.

A sixteenth embodiment is a non-transitory computer readable storage medium storing a vibration control program executable by a computer, wherein the vibration control program causes one or more processors of the computer to perform steps of: a vibration source arrangement step arranging a vibration source in a virtual space; a vibration data generation step generating vibration data corresponding to vibration that is generated from the vibration source; a reception portion setting step setting in the virtual space a reception portion configured to receive the vibration from the vibration source; a changing step changing the vibration data that is generated by the vibration data generation step based on a space situation between the vibration source that is arranged by the vibration source arrangement step and the reception portion that is set by the reception portion setting step; and a vibration control step making a vibration portion vibrate according to the vibration data that is changed by the changing step.

A seventeenth embodiment is a vibration control method, comprising steps of: (a) arranging a vibration source in a virtual space; (b) generating vibration data corresponding to vibration that is generated from the vibration source; (c) setting in the virtual space a reception portion configured to receive the vibration from the vibration source; (d) changing the vibration data that is generated in the step (b) based on a space situation between the vibration source that is arranged in the step (a) and the reception portion that is set in the step (c); and (e) making a vibration portion vibrate according to the vibration data that is changed by the step (d).

According to each of the fifteenth to seventeenth embodiments, like the first embodiment, it is also possible to present the vibration according to the various situations in the virtual space.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 6 is an illustration view showing a non-limiting example usage mode of the game apparatus shown in FIG. 1.

FIG. 7 is an illustration view showing another non-limiting example usage mode of the game apparatus shown in FIG. 1.

FIG. 8 is an illustration view showing a still another non-limiting example usage mode of the game apparatus shown in FIG. 1.

FIG. 9 is an illustration view showing the other non-limiting example usage mode of the game apparatus shown in FIG. 1.

DETAILED DESCRIPTION OF NON-LIMITING EXAMPLE EMBODIMENTS

First Embodiment

Figure 1:
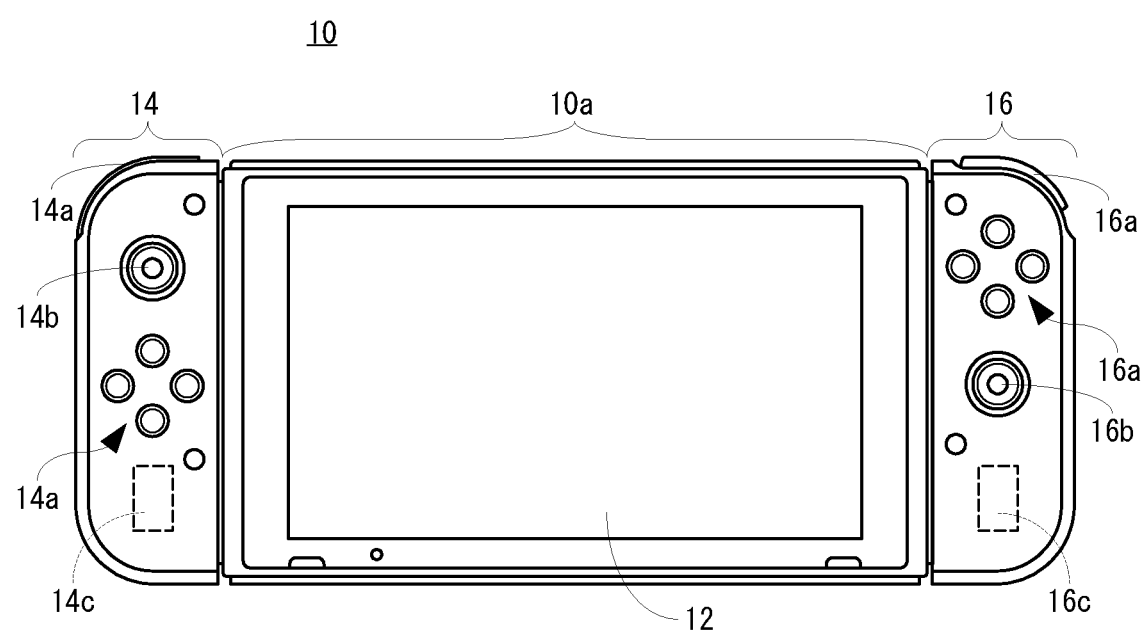
FIG. 1 is an illustration view showing a non-limiting example appearance configuration of a non-limiting example game apparatus.
Figure 2:
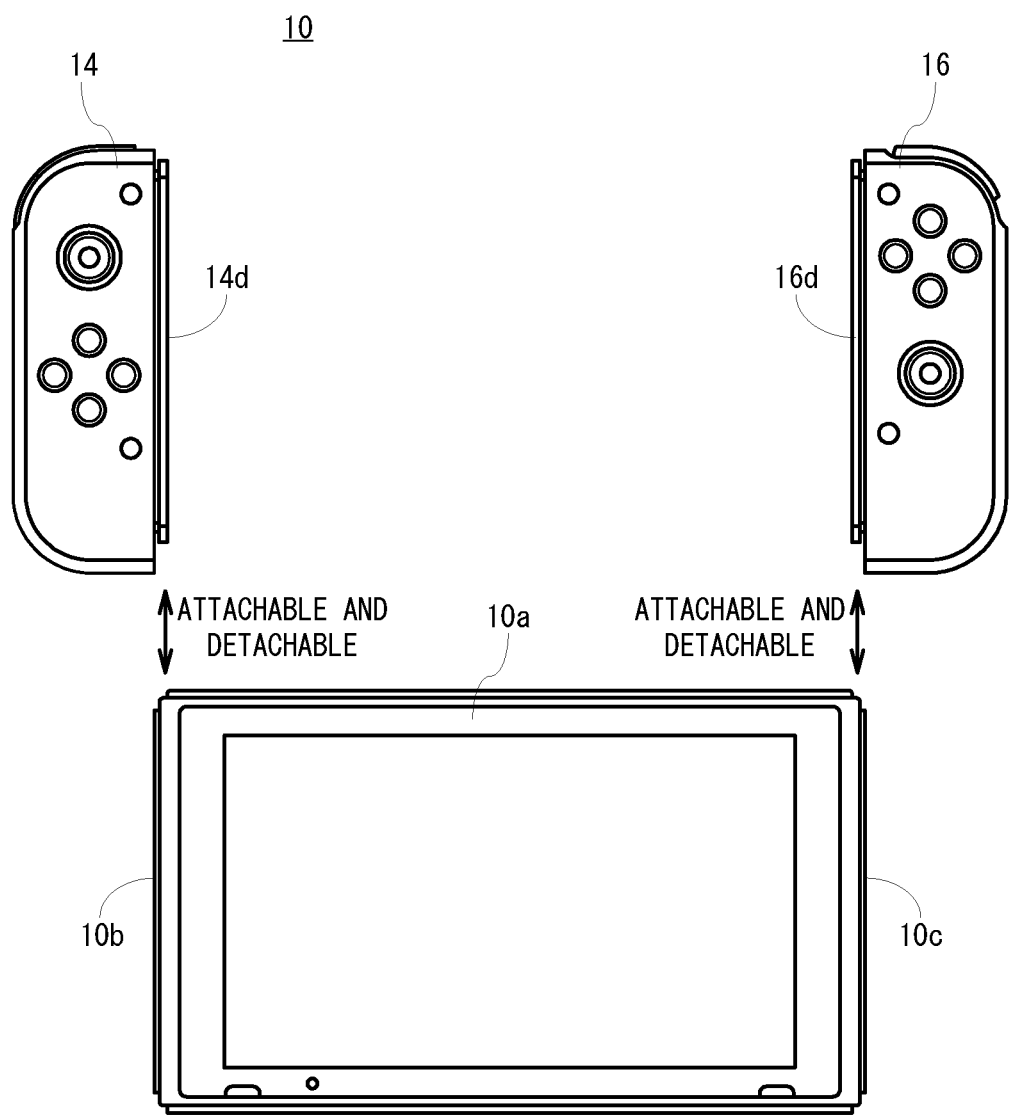
FIG. 2 is an illustration view showing a non-limiting example state where a controller is separated from a main body apparatus in the game apparatus shown in FIG. 1.

With reference to FIG. 1, a non-limiting example game apparatus 10 includes a main body apparatus 10a. The main body apparatus 10a also functions as a vibration control apparatus. A display 12 is provided on this main body apparatus 10a. The display 12 is an LCD, but may be a display using an organic EL. Moreover, the game apparatus 10 includes a first controller 14 and a second controller 16, and as shown in FIG. 2, the first controller (left controller) 14 is provided in a left side of the main body apparatus 10a in an attachable/detachable manner, and the second controller (right controller) 16 is provided in a right side of the main body apparatus 10a in an attachable/detachable manner.

In addition, although the game apparatus 10 is described as an example of an information processing apparatus in this first embodiment, a smartphone, a tablet terminal, etc. can be used for the main body apparatus 10a. However, to use a smartphone or a tablet terminal, it is necessary to provide separately structure that the first controller 14 and the second controller 16 are attachable or detachable.

Although described later for details, the first controller 14 and the second controller 16 can be used in an attached state to the main body apparatus 10a, and also can be used in a detached (separated) state from the main body apparatus 10a. When the first controller 14 and the second controller 16 are separated from the main body apparatus 10a, a single player (or user) can use both the first controller 14 and the second controller 16.

In addition, in this first embodiment, the first controller 14 and the second controller 16 are both attached to the main body apparatus 10a, or detached from the main body apparatus 10a.

Returning to FIG. 1, the first controller 14 is provided with various kinds of operation buttons 14a and an analog stick 14b. Although a detailed description is omitted, the operation buttons 14a and the analog stick 14b can be any one of surface excluding a surface attached to the main body apparatus 10a among surfaces of a housing of the first controller 14. The operation buttons 14a are provided in order to perform instructions according to various kinds of programs executed by the main body apparatus 10a. The analog stick 14b can designate a direction by being tilted. However, a slide stick may be provided instead of the analog stick 14b. Moreover, the analog stick 14b may be configured to also function as an operation button by being depressed. Moreover, in the housing of the first controller 14, there is provided with a vibration motor (vibrator) 14c for presenting vibration to a player that holds the first controller 14 (including case of being attached to the main body apparatus 10a). These can be also applied to the second controller 16 described later.

Similar to the first controller 14, the second controller 16 is provided with various kinds of operation buttons 16a and an analog stick 16b. Furthermore, a vibration motor 16c is provided in a housing of the second controller 16.

Moreover, although illustration is omitted, a connector for connecting with a charge stand 50 and a sound emission hole for emitting a sound of a speaker 38 (see FIG. 3) are provided in a bottom surface of the main body apparatus 10*a*. However, the bottom surface of the main body apparatus 10*a* is a surface perpendicular to a display surface of the display 12, and is a surface located in a lower side in FIG. 1. For example, when a player uses the game apparatus 10 shown in FIG. 1, the above-described connector and the sound emission hole turn to a side of the player.

Furthermore, as shown in FIG. 2, a rail member 10*b* is provided in a left side surface of the main body apparatus 10*a*, and a rail member 10*c* is provided in a right side surface of the main body apparatus 10*a*. On the other hand, a slider 14*d* is provided in one side surface (right side surface in FIG. 2) of a longitudinal direction of the housing of the first controller 14, and a slider 16*d* is provided in one side surface (left side surface in FIG. 2) of a longitudinal direction of the housing of the second controller 16.

The rail member 10*b* is constituted so as to be engageable with the slider 14*d*, and the rail member 10*c* is constituted so as to be engageable with the slider 16*d*. That is, a slide mechanism is formed of the rail member 10*b* and the slider 14*d*, and a slide mechanism is formed of the rail member 10*c* and the slider 16*d*. Therefore, the first controller 14 and the second controller 16 are respectively slidable on the main body apparatus 10*a*, and provided in an attachable and detachable manner.

In addition, the rail members (10*b*, 10*c*) may be provided on the controllers (14, 16), and the sliders (14*d*, 16*d*) may be provided on the main body apparatus 10*a*. Moreover, as a mechanism for attaching/detaching the first controller 14 and the second controller 16 to or from the main body apparatus 10*a*, other mechanisms may be adopted. For example, as the other mechanisms, a convex portion (or concave portion) that fits to a concave portion (convex portion) provided on the main body apparatus 10*a* may be provided on each of the housings of the first controller 14 and the second controller 16.

Figure 3:
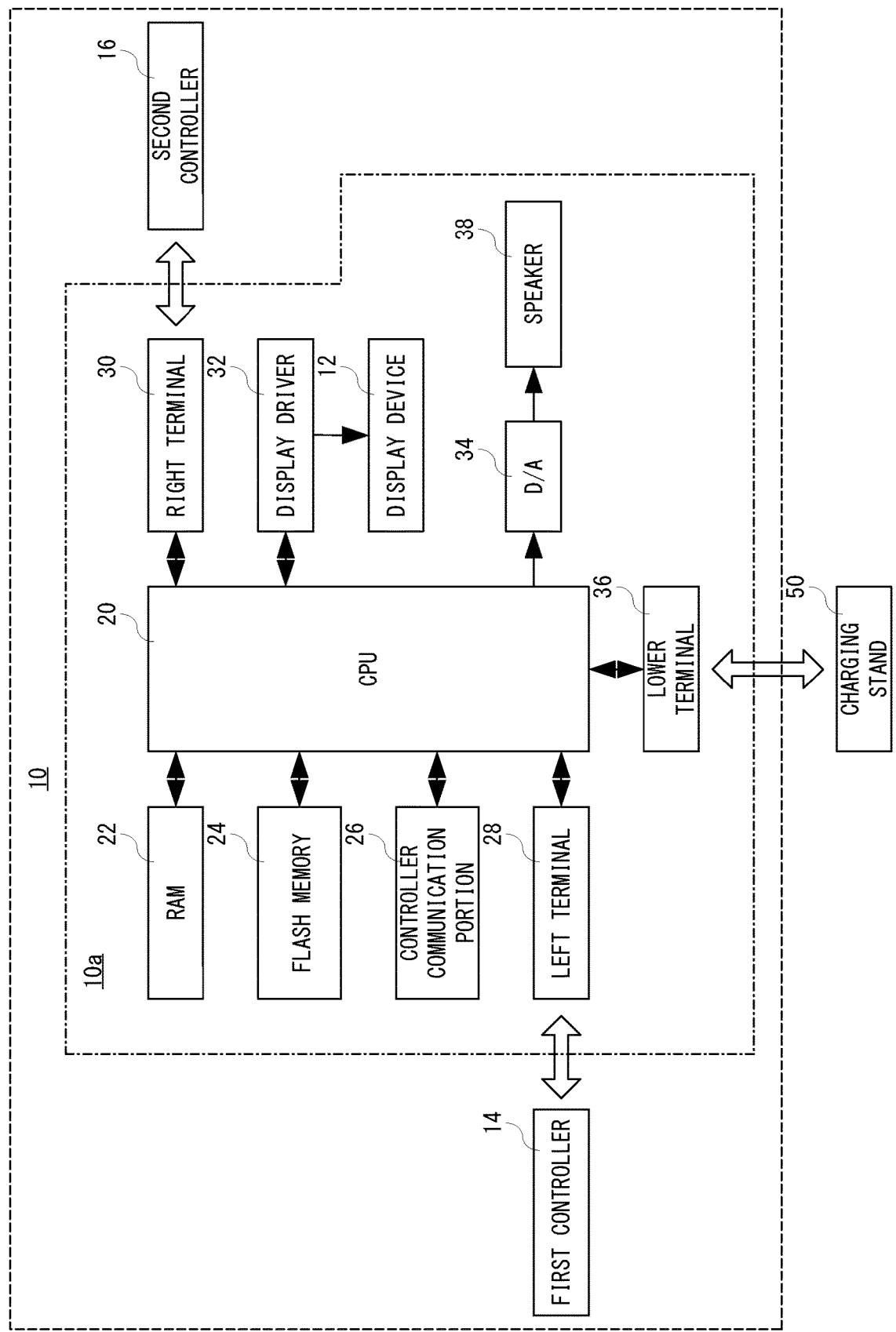
FIG. 3 is a block diagram showing a non-limiting example electric configuration of the game apparatus shown in FIG. 1 and FIG. 2.

FIG. 3 is a block diagram showing a non-limiting example electric configuration of the game apparatus 10 shown in FIG. 1 and FIG. 2. As shown in FIG. 3, the game apparatus 10 includes a CPU 20, and the CPU 20 is connected with a RAM 22, a flash memory 24, a controller communication portion 26, a left terminal 28, a right terminator 30, a display driver 32, a D/A (Digital to Analog) converter 34 and a lower terminal 36. Moreover, the display 12 is connected to the display driver 32, and the speaker 38 is connected to the D/A converter 34. These components are provided in an interior of the main body apparatus 10*a*. However, connection portions (connection terminals) of the left terminal 28, the right terminal 30 and the lower terminal 36 are provided so as to be exposed from the main body apparatus 10*a*.

As described above, the game apparatus 10 includes the first controller 14 and the second controller 16, and when these are attached to the main body apparatus 10*a*, the first controller 14 is electrically connected with the left terminal 28 and the second controller 16 is electrically connected to the right terminal 30.

Moreover, when the game apparatus 10 is put on the charge stand (cradle) 50, the bottom terminal 36 is connected with a connection plug (not shown) provided in the charge stand 50. In this case, an electric power is supplied to the game apparatus 10 through the bottom terminal 36 from the charge stand 50, whereby a battery built in the main body apparatus 10*a* can be charged, and batteries respectively built in the first controller 14 and the second controller 16 that are connected to the main body apparatus 10*a* can be charged.

Although illustration is omitted, the charge stand 50 can be connected to a television receiver with using a signal cable such as an HDMI (registered trademark) cable, and in this case, AV (audio and video (image)) data that is output via the bottom terminal 36 from the main body apparatus 10*a* is given to the television receiver 60 through the charge stand 50. Therefore, a game screen is displayed on a display (monitor) of the television receiver 60, and a voice or/and music are output from a speaker of the television receiver 60.

The CPU 20 is in charge of overall control of the game apparatus 10. The RAM 22 is a volatile storage device and is used as a working area and a buffer area of the CPU 20. The flash memory 24 is a nonvolatile storage device, and stores various programs (information processing programs) that are executable by the game apparatus 10, save data, etc.

In addition, the above-described information processing program is an application program for game as an example, but need not to be limited to this. The application program may be other programs such as a document production program, an email program, a painting program, a character or letter practice program, a linguistic training program, a learning program, etc.

In the following, a configuration that the main body apparatus 10*a* performs communication with the first controller 14 and the second controller 16 will be described.

In this first embodiment, when the first controller 14 and the second controller 16 are in a state separated from the main body apparatus 10*a*, the main body apparatus 10*a* performs wireless communication with the first controller 14 and the second controller 16. On the other hand, when the first controller 14 and the second controller 16 are attached to the main body apparatus 10*a*, the main body apparatus 10*a* performs wire-communication with the first controller 14 and the second controller 16.

The controller communication portion 26 performs wireless communication with the first controller 14 and the second controller 16. Although it is possible to adopt an arbitrary communication system for a communication system between the main body apparatus 10*a* and each controller (14, 16), in this first embodiment, a communication system according to the standard of Bluetooth (registered trademark) is adopted.

The left terminal 28 is a terminal for performing wire-communication between the CPU 20 and the first controller 14 when the first controller 14 is attached to the main body apparatus 10*a*, the CPU 20 transmits or receives data to or from the first controller 14 via the left terminal 28.

The right terminal 30 is a terminal for performing wire-communication between the CPU 20 and the second controller 16 when the second controller 16 is attached to the main body apparatus 10*a*, the CPU 20 transmits or receives data to or from the second controller 16 via the right terminal 30.

In this first embodiment, the data to be transmitted from the CPU 20 to each controller (14, 16) is vibration data for making each controller (14, 16) vibrate. The vibration data is generated, by the CPU 20, by executing program that generates vibration data, by reading vibration data being stored, or the like. Moreover, the vibration data is data that indicates a vibration waveform (waveform of an analog signal), and may be a signal of the vibration waveform itself (vibration signal), data that the vibration waveform is digitized, or data of a set of values respectively indicating a frequency and an amplitude. On the other hand, the data to be transmitted from each controller (14, 16) is operation data in a case where the operation buttons (14*a*, 16*a*) and the analog sticks (14*b*, 16*b*) respectively provided in the controllers (14, 16) are operated. However, other data such as various kinds of control signals etc. may be transmitted and received between the CPU 20 and the respective controllers (14, 16).

Thus, the main body apparatus 10*a* can perform wire-communication and wireless communication with the first controller 14 and the second controller 16, respectively.

In addition, although illustration is omitted, the left terminal 28 connects a power line for supplying a power source from the charge stand 50 to a charge circuit for the battery built in the first controller 14. This is true about the right terminal 30.

The display driver 32 includes a GPU and a video RAM, and generates, under instructions of the CPU 20, image data for a game screen (game image) to be displayed on the display 12 in the video RAM, and outputs the image data to the display 12. The D/A converter 34 converts sound data that is output from the CPU 20 into an analog sound signal that is output to the speaker 38.

In addition, as described above, when displaying a game screen on the monitor of the television receiver and outputting a sound from the speaker of the television receiver 60, the CPU 20 transmits the AV data to the television receiver via the lower terminal 36 and the charge stand 50.

The lower terminal 36 is a terminal for connecting with the charge stand 50, and is a terminal for connecting a power line from an electric power supply circuit that is incorporated in the charge stand 50 to a charge circuit for charging the battery built in the game apparatus 10 (main body apparatus 10*a*). Moreover, the lower terminal 36 is also a terminal for performing wire-communication with the charge stand 50.

In addition, the electric configuration of the game apparatus 10 shown in FIG. 3 is an example, and should not be limited. For example, a touch panel may be further provided as an input portion. In this case, the touch panel is provided on the display 12. Otherwise, a touch display that the touch panel is integrally formed with the display 12 may be used. Moreover, an inertial sensor (an acceleration sensor or/and gyro sensor) for detecting a direction (attitude) or/and movement of the game apparatus 10 may be provided.

Figure 4:
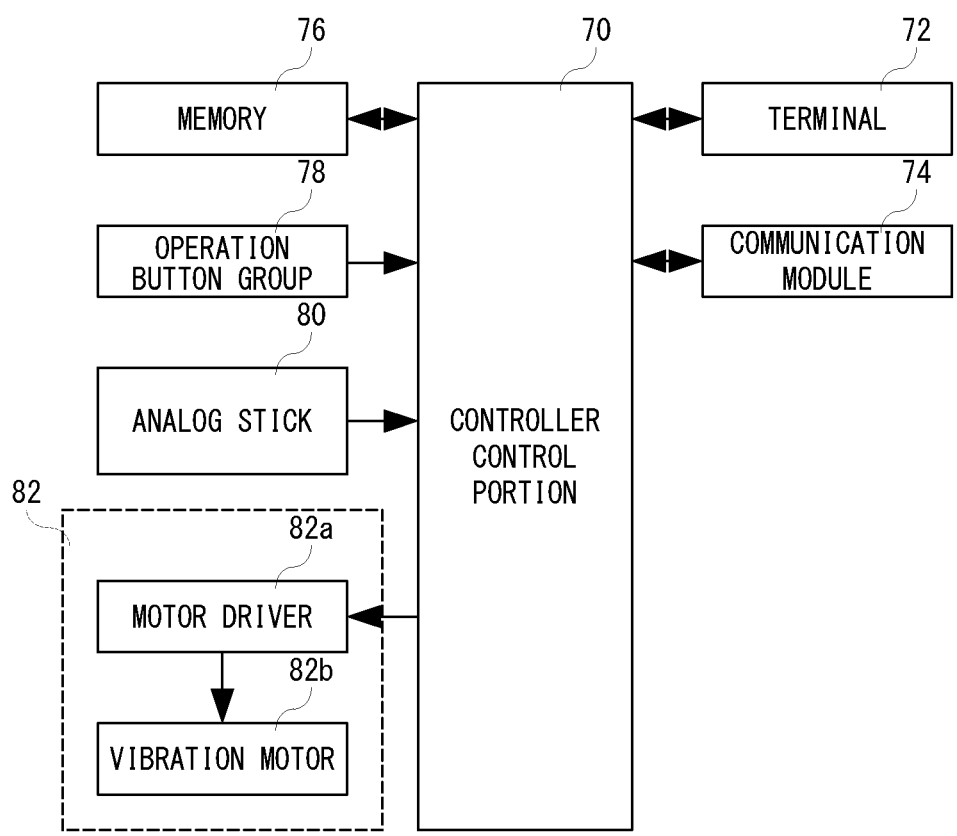
FIG. 4 is a block diagram showing a non-limiting example electric configuration of a first controller shown in FIG. 1 to FIG. 3.

FIG. 4 is a block diagram showing a non-limiting example electric configuration of the first controller 14 shown in FIG. 1 to FIG. 3. As shown in FIG. 4, the first controller 14 includes a controller control portion 70, and the controller control portion 70 is connected with a terminal 72, a communication module 74, a memory 76, an operation button group 78, an analog stick 80 and a vibration portion 82.

The controller control portion 70 includes a microcomputer(s), for example, and is in charge of overall control of the first controller 14. The terminal 72 is provided in order to electrically connect with the left terminal 28 of the main body apparatus 10*a* when the first controller 14 is attached to the main body apparatus 10*a*. The communication module 74 is provided in order to communicably connect with the main body apparatus 10*a* when the first controller 14 is separated from the main body apparatus 10*a*. As described above, since the wireless communication system according to the standard of Bluetooth (registered trademark) is adopted for the controller communication portion 26 provided in the main body apparatus 10*a*, and the communication module 74 also adopts a wireless communication system according to the standard of Bluetooth (registered trademark).

Therefore, when the first controller 14 is attached to the main body apparatus 10*a*, the controller control portion 70 receives operation data of the operation button group 78 or/and the analog stick 80, and outputs the received operation data from the terminal 72. On the other hand, when the first controller 14 is separated from the main body apparatus 10*a*, the controller control portion 70 receives the operation data as described above, and transmits the received operation data from the communication module 74 to the main body apparatus 10*a* according to the above-described wireless communication system.

Moreover, the controller control portion 70 receives (acquires), when the first controller 14 is attached to the main body apparatus 10*a*, the vibration data that is input from the terminal 72. On the other hand, the controller control portion 70 receives and acquires, when the first controller 14 is separated from the main body apparatus 10*a*, the vibration data as described above by the communication module 74.

The memory 76 is a nonvolatile storage device such as a flash memory, for example, and is stored with firmware and identification information (controller ID) of the first controller 14. The controller control portion 70 performs various kinds of processing by executing the firmware stored in the memory 76. Moreover, the controller control portion 70 notifies the controller ID to the main body apparatus 10*a* at the time that the first controller 14 is wireless-communicably connected with the main body apparatus 10*a*.

The operation button group 78 corresponds to various kinds of the operation buttons 14*a* described above, and the analog stick 80 corresponds to the analog stick 14*b* described above. Information about the operation performed to the operation button group 78 and the analog stick 80 (operation data) is repeatedly output to the controller control portion 70 at a predetermined period.

The vibration portion 82 includes a motor driver 82*a* and a vibration motor 82*b*, and the motor driver 82*a* is controlled by the controller control portion 70. The controller control portion 70 controls the vibration motor 82*b* according to the vibration data transmitted from the main body apparatus 10*a*. That is, upon receipt (acquisition) of the vibration data from the main body apparatus 10*a*, the controller control portion 70 outputs the acquired vibration data to the motor driver 82*a*. The motor driver 82*a* generates, from the vibration data from the controller control portion 70, a driving signal for making the vibration motor 82*b* vibrate, and applies the generated driving signal to the vibration motor 82*b*. Therefore, the vibration motor 82*b* operates according to the vibration data from the main body apparatus 10*a*.

For example, the vibration motor 82*b* is a linear motor, and outputs (vibrates) with a pattern according to an input waveform (vibration waveform) of an analog signal (vibration signal) such as a sound signal. However, in this first embodiment, the vibration data is data of a set of a value of the frequency and a voltage value corresponding to the amplitude, which corresponds to a signal value (frequency and amplitude) at each time point of the analog signal (vibration signal). By being applied with a voltage value indicated by the vibration data so as to increase or decrease at a frequency indicated by the vibration data in accordance with the signal value at each time point of the vibration signal, a position of an internal weight is changed, whereby the linear motor as the vibration motor 82*b* can output (vibrate) with the pattern according to the input waveform.

In addition, the vibration motor 82*b* may be a motor capable of controlling an amplitude, and for example, a motor that vibration can be generated by a piezoelectric element, a voice coil, a ultrasonic wave, or the like can be used for it.

Moreover, the electric configuration of the first controller 14 shown in FIG. 4 is an example, and should not be limited. For example, an inertial sensor (an acceleration sensor or/and gyro sensor) for detecting a direction (attitude) or/and movement of the first controller 14 may be provided.

Figure 5:
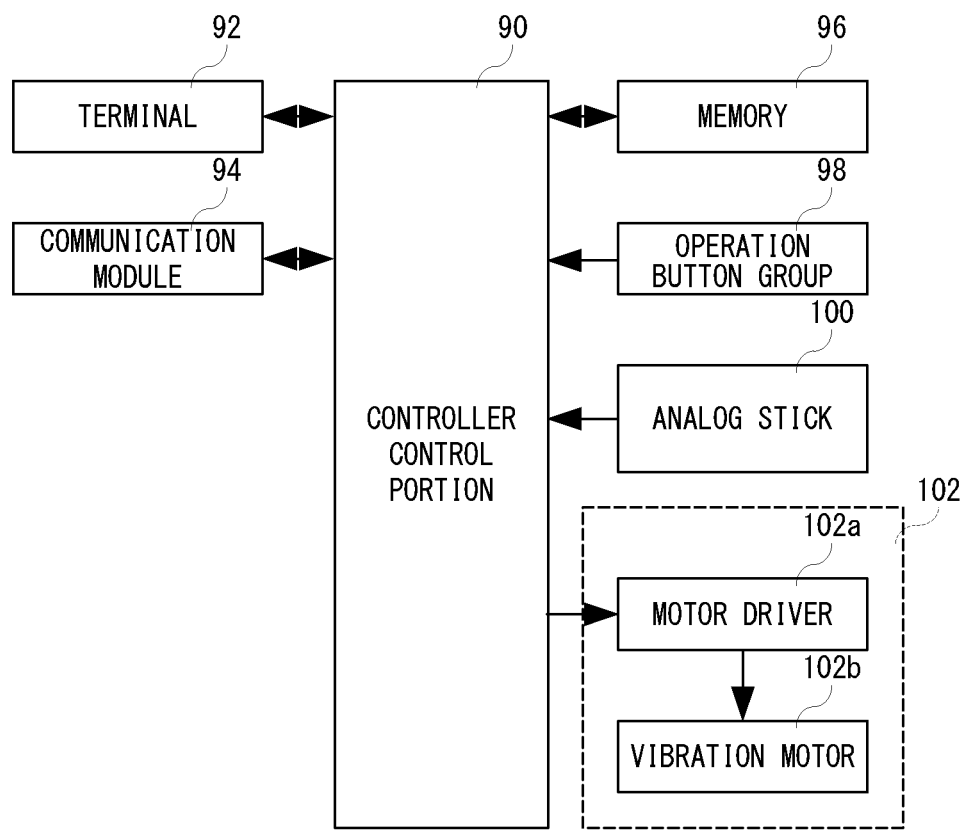
FIG. 5 is a block diagram showing a non-limiting example electric configuration of a second controller shown in FIG. 1 to FIG. 3.

FIG. 5 is a block diagram showing a non-limiting example electric configuration of the second controller 16 shown in FIG. 1 to FIG. 3. As shown in FIG. 5, the second controller 16 includes a controller control portion 90, and the controller control portion 90 is connected with a terminal 92, a communication module 94, a memory 96, an operation button group 98, an analog stick 100 and a vibration portion 102.

As shown in FIG. 5, the electric configuration of the second controller 16 is the same as the electric configuration of the first controller 14 shown in FIG. 4 in this first embodiment, and therefore, a description about respective components thereof is omitted.

In addition, although the electric configurations of the first controller 14 and the second controller 16 are made the same in this first embodiment, but need not be the same.

FIG. 6 is an illustration view showing a non-limiting example usage mode (first mode) of the game apparatus 10. As shown in FIG. 6, in the game apparatus 10 of the first mode, the first controller 14 and the second controller 16 are used in a state of being attached to the main body apparatus 10a. In this case, a player holds the game apparatus 10 with both hands, and operates the first controller 14 with the left hand and the second controller 16 with the right hand. That is, the game apparatus 10 functions as a portable game apparatus.

Therefore, when the first controller 14 is operated, operation data is input to the CPU 20 through the terminal 72 and the left terminal 28 from the controller control portion 70. Similarly, when the second controller 16 is operated, operation data is input to the CPU 20 through the terminal 92 and the right terminal 30 from the controller control portion 90.

Moreover, the vibration data from the CPU 20 is input to the controller control portion 70 via the left terminal 28 and the terminal 72 of the first controller 14. Similarly, the vibration data from the CPU 20 is input to the controller controlling portion 90 via the right terminal 30 and the terminal 92 of the second controller 16.

In the first controller 14, the controller control portion 70 inputs vibration data to the motor driver 82a, and the motor driver 82a drives the vibration motor 82b according to the vibration data. Moreover, in the second controller 16, the controller control portion 90 inputs vibration data to the motor driver 102a, and the motor driver 102a drives the vibration motor 102b according to the vibration data.

When the vibration motor 82b provided in the first controller 14 is driven, vibration that is generated by the vibration motor 82b is conveyed to the both hands holding the game apparatus 10. Moreover, when the vibration motor 102b provided in the second controller 16 is driven, vibration that is generated by the vibration motor 102b is conveyed to the both hands holding the hold of the game apparatus 10. That is, a player perceives the vibration with both hands.

In addition, the vibration motor 82b and the vibration motor 102b may be driven simultaneously, or may be driven severally. Moreover, the vibration data of the same content (frequency and voltage value) may be input to the vibration motor 82b and the vibration motor 102b, or the vibration data having different content may be input. These are true also for a second mode and a third mode respectively described later.

FIG. 7 is an illustration view showing another non-limiting example usage mode (second mode) of the game apparatus 10. As shown in FIG. 7, in the game apparatus 10 of the second mode, the first controller 14 and the second controller 16 are used in a state of being separated from the main body apparatus 10a. In this case, a player holds the first controller 14 with the left hand and the second controller 16 with the right hand, and the main body apparatus 10a is placed in a state of standing on a desk or stand. However, the state of standing the main body apparatus 10a means a state where the display surface of the display 12 provided on the main body apparatus 10a is perpendicular to the horizontal plane or slightly inclined from the vertical direction. For example, it is possible to render the main body apparatus 10a in a standing state by putting the main body apparatus 10a on the charge stand 50.

In the second mode, when the first controller 14 is operated, the operation data from the controller control portion 70 is transmitted from the communication module 74, and is received in the controller communication portion 26 to be input to the CPU 20. Similarly, when the second controller 16 is operated, the operation data from the controller control portion 90 is transmitted from the communication module 94, and is received in the controller communication portion 26 to be input to the CPU 20.

Moreover, the vibration data from the CPU 20 is transmitted from the controller communication portion 26, and is received by the communication module 74 of the first controller 14 to be input to the controller control portion 70. Similarly, the vibration data from the CPU 20 is transmitted from the controller communication portion 26, and is received by the communication module 94 of the second controller 16 to be input to the controller control portion 90.

As described for the first mode, the vibration motor 82b of the first controller 14 is driven according to the vibration data from the controller control portion 70, and the vibration motor 102b of the second controller 16 is driven according to the vibration data from the controller control portion 90.

When the vibration motor 82b provided in the first controller 14 is driven, the vibration generated by the vibration motor 82b is conveyed to the left hand that holds the first controller 14, and when the vibration motor 102b provided in the second controller 16 is driven, the vibration generated by the vibration motor 102b is conveyed to the right hand that holds the second controller 16. That is, a player perceives the vibration by the left hand and the right hand, respectively.

In addition, when the first controller 14 and the second controller 16 are used while being separated from the main body apparatus 10a, it is necessary to wirelessly communicably connect them with the main body apparatus 10a. Since the wireless communication is performed according to the standard of Bluetooth (registered trademark) in this first embodiment, at the time that the power of the game apparatus 10 (main body apparatus 10a) is turned on, or at the time that an application such as a game is started, the main body apparatus 10a is connected to (paired with) the controllers (14, 16, etc.).

In this case, the main body apparatus 10a (parent machine) is set in a mode (pairing mode) capable of searching the controller (child machine such as 14, 16 etc.), whereas the controller (14, 16 etc.) is also set in a pairing mode capable of searching the main body apparatus 10a by operating a predetermined operation button (14a, 16a etc.).

When the main body apparatus 10a searches the controller (14, 16, etc.) that emits a predetermined signal and detects the controllers (14, 16, etc.), connection is performed. When the connection is completed, the main body apparatus 10a is registered with identification information (controller ID) of the connected controller (14, 16, etc.). This is true for a case where a further controller such as a third controller 120 described later is wirelessly communicably connected to the main body apparatus 10a.

FIG. 8 is an illustration view showing another non-limiting example usage mode (third mode) of the game apparatus 10. As shown in FIG. 8, in the game apparatus 10 of the third mode, the first controller 14 and the second controller 16 are used in a status of being separated from the main body apparatus 10a, like a case of the second mode. However, in the third mode, the first controller 14 and the second controller 16 are coupled to each other using a connection member 18 so as to be used as a single controller that the first controller 14 and the second controller 16 are provided integrally (hereinafter, may be called a "controller 110").

Although a detailed description is omitted, the connection member 18 is formed in a shape of a quadrangular prism or a hollow hexahedron, and a rail member that is the same as the rail member 10b is provided on a surface (first side surface) that the first controller 14 is attached/detached and a rail member that is the same as the rail member 10c is provided on a surface (second side surface) that the second controller 16 is attached/detached. However, the first side surface is a surface opposite to the second side surface.

In the third mode, a player operates the first controller 14 with the left hand and the second controller 16 with the right hand while holding the controller 110 with both hands. Moreover, the main body apparatus 10a is placed in a state of standing on a desk or stand, like the second mode.

Therefore, when the first controller 14 is operated, operation data from the controller control portion 70 is transmitted from the communication module 74, and is received by the controller communication portion 26 to be input to the CPU 20. Similarly, when the second controller 16 is operated, operation data from the controller control portion 90 is transmitted from the communication module 94, and is received by the controller communication portion 26 to be input to the CPU 20.

Moreover, vibration data from the CPU 20 is transmitted from the controller communication portion 26, and is received by the communication module 74 of the first controller 14 to be input to the controller control portion 70. Similarly, the vibration data from the CPU 20 is transmitted from the controller communication portion 26, and is received by the communication module 94 of the second controller 16 to be input to the controller control portion 90.

Also in this case, as described in the first mode, the vibration motor 82b of the first controller 14 is driven according to the vibration data from the controller control portion 70, and the vibration motor 102b of the second controller 16 is driven according to the vibration data from the controller control portion 90.

When the vibration motor 82b provided in the first controller 14 is driven, vibration generated by the vibration motor 82b is conveyed to the both hands that hold the controller 110. Moreover, when the vibration motor 102b provided in the second controller 16 is driven, vibration generated by the vibration motor 102b is conveyed to the both hands that hold the controller 110. That is, a player perceives the vibration with both hands.

FIG. 9 is an illustration view showing a further non-limiting example usage mode (fourth mode) of the game apparatus 10. As shown in FIG. 9, in the game apparatus 10 of the fourth mode, a third controller 120 is used instead of the first controller 14 and the second controller 16. In this case, the game apparatus 10 is constituted by the main body apparatus 10a and the third controller 120.

In addition, although the first controller 14 and the second controller 16 are separated from the main body apparatus 10a in an example shown in FIG. 9, if not using the first controller 14 and the second controller 16, these may be in a state of being attached to the main body apparatus 10a.

In the fourth mode, a player holds and operates the third controller 120 with both hands. Moreover, the main body apparatus 10a is placed in a state of standing on a desk or stand, like the second mode and the third mode.

The third controller 120 is provided with various kinds of operation buttons 120a and two left and right analog sticks (a left analog stick 158 and a right analog stick 160) 120b. Moreover, the third controller 120 is provided with two vibration motors (vibration motor 162b and vibration motor 164b) 120c in interiors of two left and right grip portions. The third controller 120 having such a configuration is the same as the controller 110 of the third mode about a function of being operated and a function making vibration to be perceived, but it is possible to say that this is a controller that can be held more easily than the controller 110.

Figure 10:
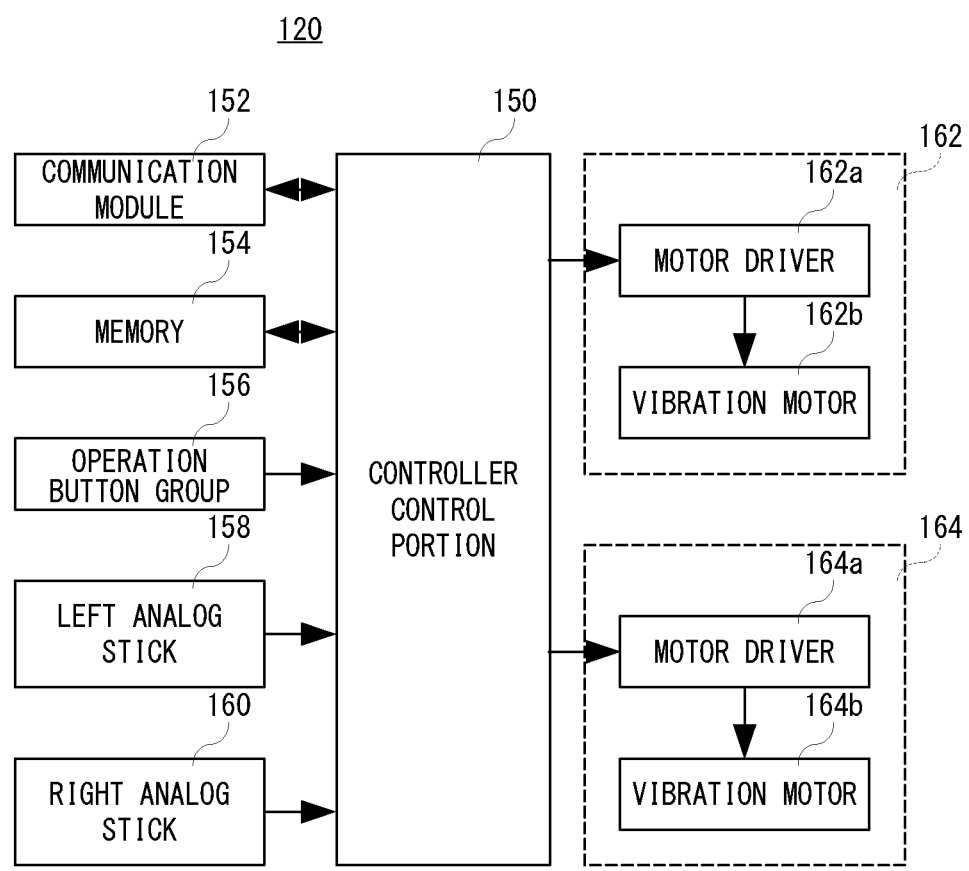
FIG. 10 is a block diagram showing a non-limiting example electric configuration of a third controller shown in FIG. 9.

FIG. 10 is a block diagram showing a non-limiting example electric configuration of the third controller 120. As shown in FIG. 10, the third controller 120 includes a controller control portion 150, and the controller control portion 150 is connected with a communication module 152, a memory 154, an operation button group 156, a left analog stick 158, a right analog stick 160, a left vibration portion 162 and a right vibration portion 164. The left vibration portion 162 includes a motor driver 162a and a vibration motor 162b, and the motor driver 162a is connected to the controller control portion 150. Moreover, the right vibration portion 164 includes a motor driver 164a and a vibration motor 164b, and the motor driver 164a is connected to the controller control portion 150. Moreover, the operation button group 156 corresponds to various kinds of operation buttons 120a.

Since respective components shown in FIG. 10 have the same function as those of respective components provided in the first controller 14 shown in FIG. 4, a duplicate description is omitted.

In addition, since the third controller 120 is not attached to the main body apparatus 10a, terminals like the terminal 72 and the terminal 92 are not provided. However, when making the third controller 120 connectable with the main body apparatus 10a using a signal cable, terminals for connecting the signal cable are provided in the main body apparatus 10a and the third controller 120, respectively.

In the fourth mode, when the third controller 120 is operated, operation data from the controller control portion 150 is transmitted from the communication module 152, and is received by the controller communication portion 26 to be input to the CPU 20.

Moreover, the vibration data from the CPU 20 is transmitted from the controller communication portion 26, and is received by the communication module 152 of the third controller 120 to be input to the controller control portion 150. In the third controller 120, according to the vibration data, the controller control portion 150 drives the vibration motor 162b of the left vibration portion 162 and the vibration motor 164b of the right vibration portion 164. However, the vibration data transmitted from the CPU 20 may have the same content for the vibration motor 162*b* and the vibration motor 164*b*, or may have different contents.

When the vibration motor 162*b* provided in the left grip portion of the third controller 120 is driven, vibration generated by the vibration motor 162*b* is conveyed to both hands that hold the third controller 120. Moreover, when the vibration motor 164*b* provided in the right grip portion of the third controller 120 is driven, vibration generated by the vibration motor 164*b* is conveyed to both hands that hold the third controller 120. That is, a player perceives the vibration with both hands.

Although the third controller 120 having a shape as shown in FIG. 9 is used in this first embodiment as the further controller different from the first controller 14 and the second another controller 16, the shape of the further controller does not need to be limited. For example, as the further controller, controllers of other shapes may be used, such as a shape of the model gun, a shape imitating an animation character or game character, a shape imitating an instrument, a shape imitating a writing instrument. Thus, it is possible to use, as the further controller, not only a controller whose housing has a further shape but also a controller attaching the first controller 14 or/and the second controller 16 to an attachment. For example, an attachment having a shape imitating a handle of cars or airplanes, an attachment having a shape of a model gun, an attachment having a shape imitating a sword, or the like can be used.

In this first embodiment, the vibration data is input to an operating system from an application program. Then, the vibration data is transmitted to the first controller 14, the second controller 16 or the third controller 120 from the operating system. Since the application program and the operating system are executed by the CPU 20, respectively, the CPU 20 functions as an application execution portion and an operating system execution portion. Moreover, since the operating system execution portion controls main body functions, the CPU 20 functions also as a vibration control portion that controls the vibration of the vibration motor 82*b*, 102*b*, 162*b* or 164*b*.

As described above, in this first embodiment, the controller to be used may be changed according to the usage mode of the game apparatus 10, and a communication method that the vibration data is transmitted to the first controller 14 and the second controller 16 may differ. Therefore, in this first embodiment, it is constituted to determine the usage mode of the game apparatus 10 at the timing that an application that contains the vibration control is started, the timing that a predetermined event occurs, and so on.

However, it is determined whether the first controller 14 and the second controller 16 are attached to the main body apparatus 10*a* prior to determining the usage mode of the game apparatus 10, and when the first controller 14 and the second controller 16 are separated from the main body apparatus 10*a*, the pairing processing is performed between the main body apparatus 10*a* and each of the first controller 14, the second controller 16 and the further controller (the third controller 120).

For example, when the application program of a game is to be executed, the player selects, with referring to a setting screen (not shown) of the usage mode of the game apparatus 10, the game is to be played with which one of the usage modes of the first mode to the fourth mode. Moreover, in the fourth mode, there is an occasion that a further controller such as the third controller 120 etc. can be selected. This selection result is notified to the operating system that controls the main body functions. However, dependent on the kind of the application, the usage mode of the game apparatus 10 determined in advance or/and presence or absence of use of the further controller such as the third controller 120 may be forcedly selected.

When the game apparatus 10 is used in the first mode, the CPU 20 transmits the vibration data to the first controller 14 and the second controller 16 by wire-communication. Moreover, when the game apparatus 10 is used in the second mode or the third mode, the CPU 20 transmits the vibration data to the first controller 14 and the second controller 16 by wireless communication. The vibration motor 82*b* is driven according to the vibration data from the controller control portion 70 in the first controller 14, and the vibration motor 102*b* is driven according to the vibration data from the controller control portion 90 in the second controller 16. A voltage having a voltage value indicative of the amplitude included in the vibration data is applied to the vibration motor 82*b* and the vibration motor 102*b*. However, the amplitude is not uniquely determined with respect to the voltage value specified by the vibration data, but the amplitude of actual vibration is determined by the frequency of vibration and the characteristic of the housing of the device.

Moreover, when the game apparatus 10 is used in the fourth mode and the third controller 120 is used as the further controller, the CPU 20 transmits the vibration data to the third controller 120 by wireless communication. In the third controller 120, the vibration motor 162*b* and the vibration motor 164*b* are driven according to the vibration data from the controller control portion 150. In also the fourth mode, the voltage of the voltage value indicating the amplitude included in the vibration data is applied to the vibration motor 162*b* and the vibration motor 164*b*.

Figure 11:
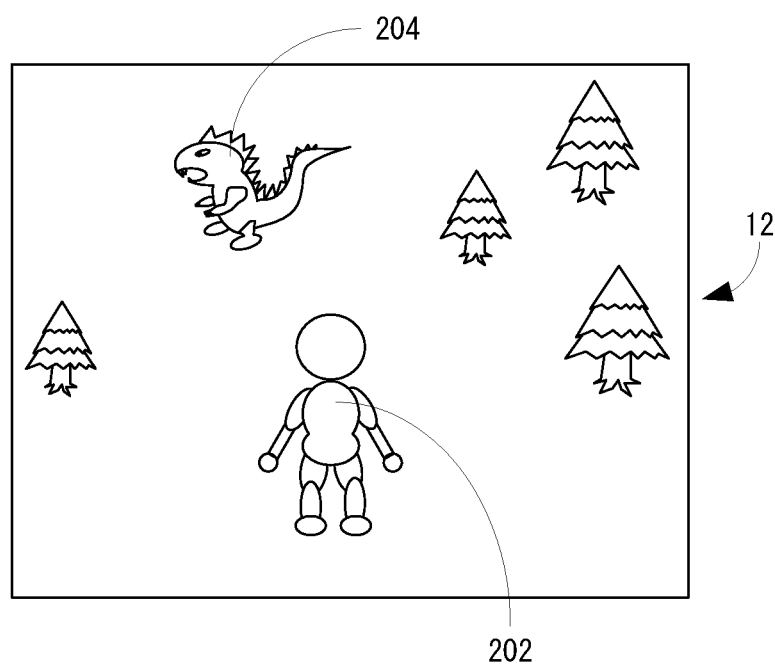
FIG. 11 is an illustration view showing a non-limiting example game screen to be displayed on a display device shown in FIG. 1 to FIG. 3.

With the above-described game apparatus 10 (main body apparatus 10*a*), when executing an application (game program) of a game, it is possible to play a game that progresses in a virtual space (in a virtual game space). Although detailed description and illustration are omitted, in this first embodiment, the virtual space is a three-dimensional virtual space. FIG. 11 shows a non-limiting example game screen 200 to be displayed on the display device 12 in this first embodiment.

Although detailed description is omitted, in the virtual space, virtual objects such as plants (including flowers) objects, terrain objects and building objects are provided, and a player object (player character) 202 is arranged. Moreover, in the virtual space, there are also arranged non-player objects (non-player characters) such as an enemy object(s) (enemy character(s)) 204, a villager object(s) (villager character(s)), etc. Although illustration is omitted, an item object(s) (item character(s)) may be arranged in the virtual space.

For example, the player object 202 can be moved freely within a map that is set in the virtual space according to an operation by the player. In the virtual space, the player object 202 fights with the enemy object 204, acquires an item, uses an item, or arrives at a target location or place, and achieves the final aim.

Moreover, when a physical strength value of the player object 202 runs-out, or when the player object 202 is knocked down on the enemy object 204, the game is over. However, the predetermined number of miss may be permitted by setting remaining lives for the player object 202. In such a case, when the remaining lives of the player object 202 becomes 0 (zero), the game is over.

In the game, a character or object that generates vibration (hereinafter, may be called "an object of vibration source") may be arranged (appear) in the virtual space, and the game screen 200 including the object of vibration source may be displayed. The vibration source is made to generate vibration when being displayed in the game screen 200 and when a predetermined event occurs.

For example, if the enemy object 204 is a vibration source, in a state that the enemy object 204 is arranged (appears) in the virtual space and being displayed in the game screen 200, vibration is generated when the enemy object 204 roars (utters a loud voice), or when the enemy object 204 stamps, for example. Moreover, if a predetermined item such as a bomb object is a vibration source, in a state where the bomb object is arranged (appear) in the virtual space and being displayed in the game screen 200, when the bomb object explodes, vibration is generated.

However, these are examples and characters or objects other than the enemy object 204 and the item may be set as the object of vibration source.

When the vibration is to be generated, vibration data is generated or read by the application program of the game, and is transmitted to an operating system. The operating system drives the vibration motors 82*b*, 102*b*, 162*b*, and 164*b* according to the vibration data from the application program.

Figure 12:
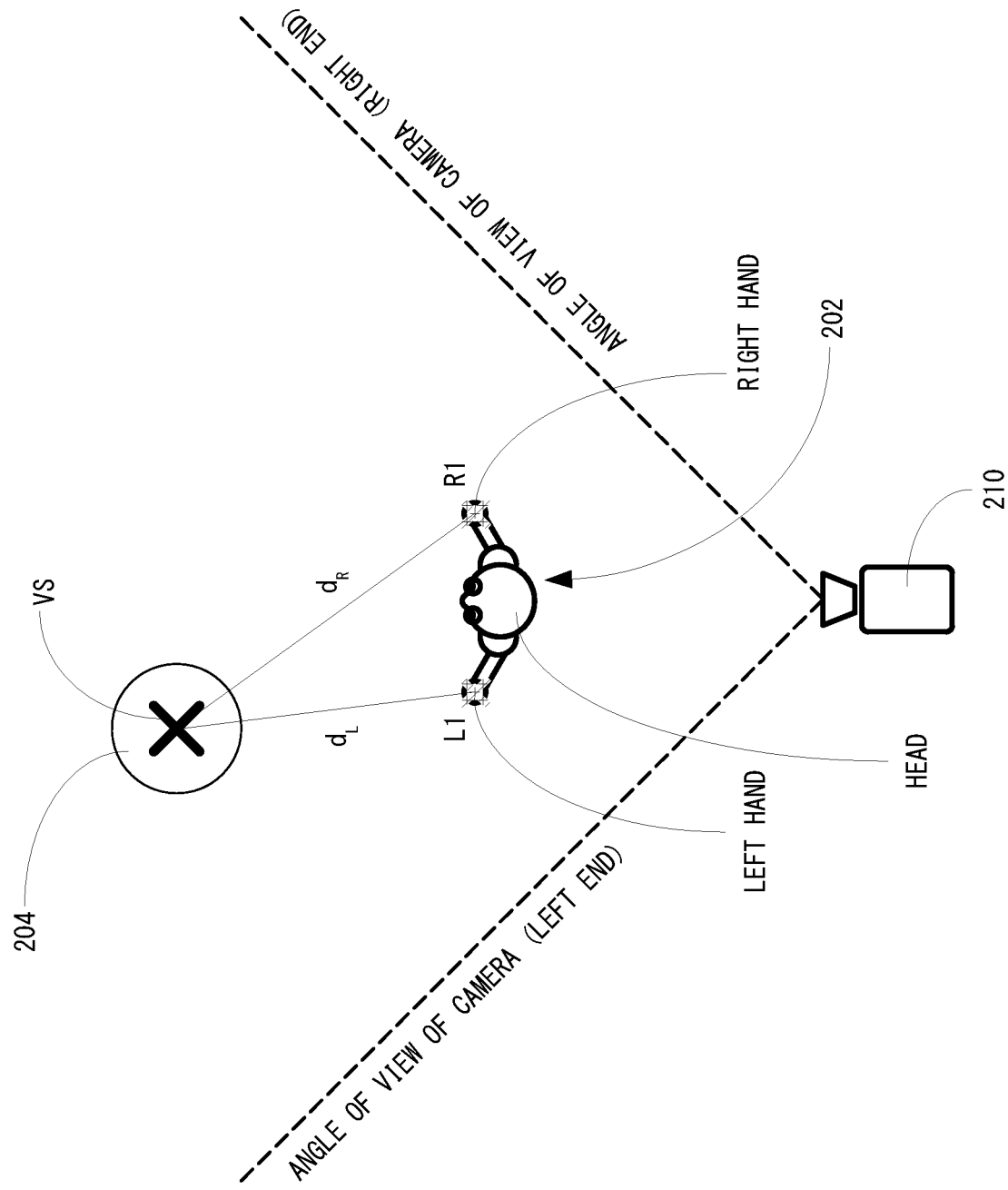
FIG. 12 is an illustration view showing a non-limiting example setting method of a vibration source and a reception portion in a virtual space.

In this first embodiment, as shown in FIG. 12, the reception portion (in the first embodiment, a reception portion L and a reception portion R) that receives the vibration generated in the object of vibration source VS and the vibration source VS are set in the virtual space. However, the object of vibration source VS is set in advance by a game developer, etc., and the reception portion is set in a game space in advance according to a method decided by the game developer, etc.

FIG. 12 is an illustration view showing a non-limiting example a virtual space when being viewed from directly above. A virtual camera 210 is arranged in the virtual space, in addition to the player object 202 and the enemy object 204. However, in FIG. 12, the enemy object 204 is indicated by a circle. In addition, in FIG. 12, characters and objects irrelevant to generation and reception of vibration are omitted.

As shown in FIG. 12, the enemy object 204 is arranged in front of the player object 202, and the virtual camera 210 is arranged behind the player object 202. A left end and a right end of an angle of view of the virtual camera 210 in a left-right direction are indicated by dotted lines. Although a case of a third person viewpoint game is shown in FIG. 12, in a case of a first person viewpoint game, the player object 202 and the virtual camera 210 are arranged so that a position of a head of the layer object 202 corresponds to a position of the virtual camera 210. The contents to be described below can be similarly applied to a case of the first person viewpoint game.

As described above, in this first embodiment, when using the game apparatus 10 in any one of the first mode-third mode, the first controller 14 and the second controller 16 are used, and the two vibration motors 82*b* and 102*b* are made to vibrate, respectively. Moreover, when using the game apparatus 10 in the fourth mode and using the third controller 120, the two vibration motors 162*b* and 164*b* are made to vibrate, respectively.

Therefore, two left and right reception portions L and reception portions R are set in the virtual space, and vibration generated by the vibration source VS is received by the reception portion L and the reception portion R, respectively, and at the time of use, the vibration that are respectively received by the reception portion L and the reception portion R are generated in two vibration portions arranged in left and right. In the first mode-third mode, the vibration received by the reception portion L is generated in the vibration portion 82 (first controller 14), and the vibration received by the reception portion R is generated in the vibration portion 102 (second controller 16). Moreover, when the third controller 120 is used in the fourth mode, the vibration received by the reception portion L is generated in the left side vibration portion 162 (left side grip), and the vibration received by the reception portion R is generated in the right side vibration portion 164 (right side grip).

In the example shown in FIG. 12, the vibration source VS generates vibration that is to be generated by an action of the enemy object 204 in the virtual space, and is set in a position of the enemy object 204. The reception portion L is set in a position of the left hand of the player object 202, and the reception portion R is set in a position of the right hand of the player object 202. That is, in the first embodiment, the vibration source VS, the reception portion L and the reception portion R are indicated by dots, respectively, and shown with x marks in FIG. 12, respectively. This is the same for x marks shown in FIG. 14, FIG. 15, FIG. 19, FIG. 21 and FIG. 22 all described later.

Moreover, a magnitude of the vibration received in the reception portion L is determined by attenuating the vibration generated by the vibration source VS according to a situation (a space situation or a space state) of the virtual space between the vibration source VS and the reception portion L. Similarly, a magnitude of the vibration received in the reception portion R is determined by attenuating the vibration generated by the vibration source VS according to a space situation or a space state between the vibration source VS and the reception portion R (hereinafter, simply called "space situation").

Here, in this specification, the space situation means distances d between the vibration source VS and each of the reception portion L and the reception portion R. As shown in FIG. 12, a distance d between the vibration source VS and the reception portion L may be expressed as a distance $d_L$, and a distance d between the vibration source VS and the reception portion R may be expressed as a distance $d_R$. Furthermore, the space situation may also include information of a conveyance medium between the vibration source VS and each of the reception portion L and the reception portion R. Moreover, in the first embodiment, it is assumed that the vibration is conveyed through an air in the virtual space.

Figure 13:
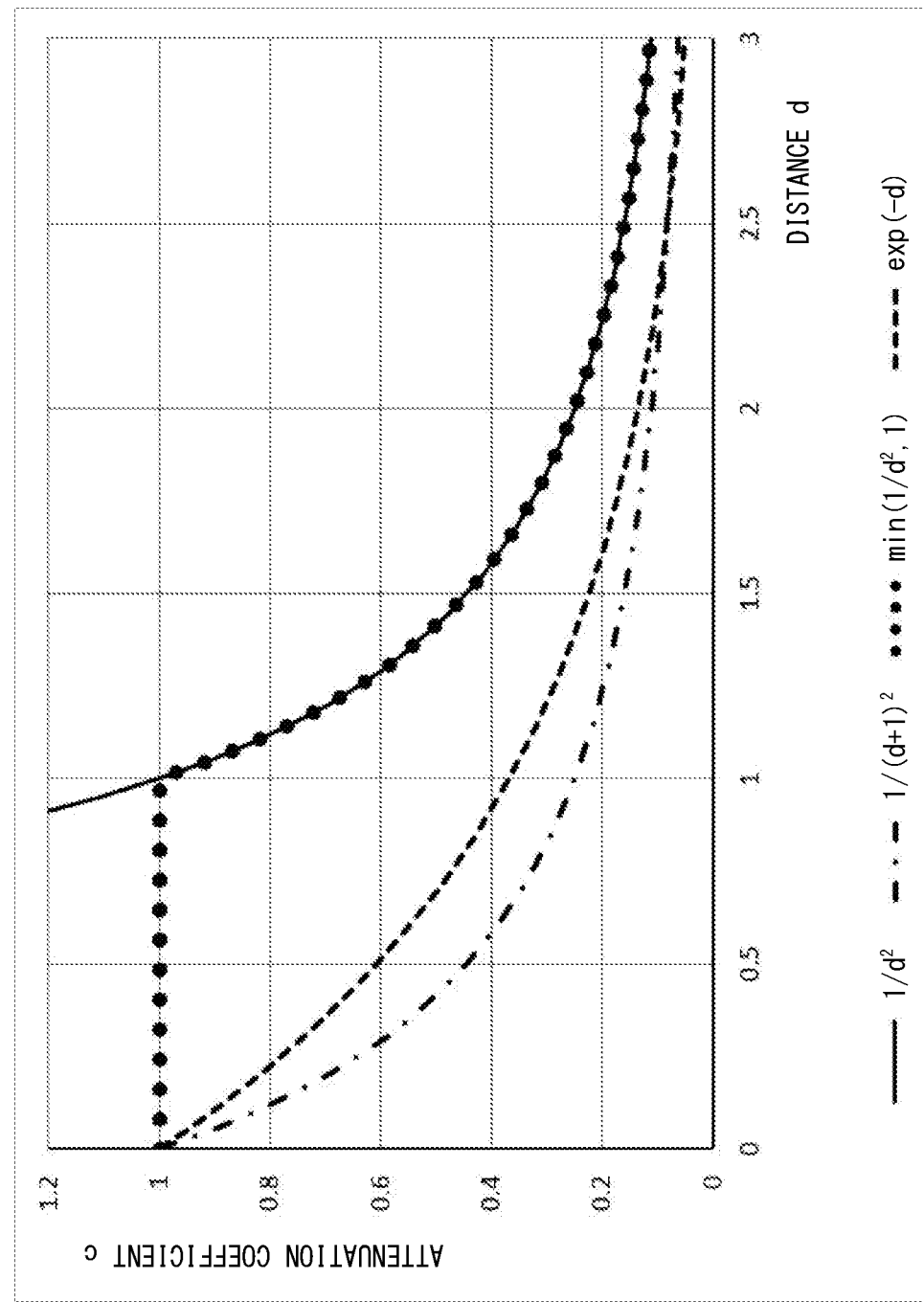
FIG. 13 is an illustration view showing a non-limiting example graph that indicates a change of an attenuation coefficient for attenuating vibration that is conveyed to the reception portion from the vibration source with respect to a distance.

In this first embodiment, the vibration from the vibration source VS is attenuated in inverse proportion to a square of the distance d and is conveyed to the reception portion L and the reception portion R, respectively. As described above, the vibration data is data of a set of a value of the frequency and a voltage value indicative of an amplitude, and therefore, as an example, the voltage value is described in inverse proportion to the square of the distance d. The decreased voltage value, i.e., a voltage value of the vibration data to be transmitted to the controller (14, 16, 120) is calculated according to Equation 1.

$$V = c \times Vo \qquad \text{[Equation 1]}$$

wherein V denotes the decreased voltage, c denotes the attenuation coefficient, and Vo denotes the voltage value of the vibration data corresponding to the vibration that is generated in the vibration source VS, i.e., a voltage value before decreased. FIG. 13 is an illustration view showing a non-limiting example graph that indicates a change of the attenuation coefficient c according to the distance d. In FIG.

13, as shown by a solid line, the attenuation coefficient c is changed in inverse proportion to the square of the distance d.

In addition, as described above, the attenuation coefficient c is a value in inverse proportion to the square of the distance d in accordance with the physical laws; however, in the virtual space, the attenuation coefficient c may be calculated in inverse proportion to the distance d.

Moreover, as described above, if the attenuation coefficient c is made to be in inverse proportion to the square of the distance d, the attenuation coefficient c will exceed 1 (one) when the distance d is small. Therefore, the attenuation coefficient c may be calculated so as not to exceed 1 (one) with other methods.

For example, an adjustment value (for example, 1) may be added to the distance d. In such a case, as shown by an alternate long and short dashes line in FIG. 13, the attenuation coefficient c becomes to be calculated according to a curve that a curve of a case where the attenuation coefficient c is in inverse proportion to the square of the distance d is shifted to left by 1 (one) in the distance d, and thus, the attenuation coefficient c does not exceed 1 (one) even if the distance d is small.

Moreover, as other methods, the attenuation coefficient c may be made to be clamped at 1 (one). In such a case, although the attenuation coefficient c is made in inverse proportion to the square of the distance d as indicated by a dotted line in FIG. 13, the attenuation coefficient c is fixed at 1 (one) when the distance d is less than 1 (one).

Furthermore, the attenuation coefficient c may be calculated with another function that it does not exceed 1 (one), as other methods. For example, the other function is an exponential function exp (−d), and as shown by a broken line in FIG. 13, and the attenuation coefficient c does not exceed 1 (one) irrespective of the distance d.

Moreover, other than a case where the vibration is simply attenuated, the vibration may be made not to be generated (not calculating the attenuation coefficient c) when the distance d exceeds a predetermined value (marginal distance D). The attenuation coefficient c explained using FIG. 13 does not become 0 (zero) even if the distance d approaches infinitely, and it is mostly changeless if the attenuation coefficient c is less than a predetermined value (for example, 0.1), and in such a case, it is difficult to present the vibration according to the difference in the distance d. Moreover, by providing a range where it is not necessary to calculate the attenuation coefficient c, a calculation processing load can be reduced.

However, if the attenuation coefficient c suddenly becomes 0 (zero) when the distance d exceeds the marginal distance D, the vibration is suddenly stopped, and the player feels discomfort or discontinuity, and therefore, in order to avoid such inconvenience, an attenuation coefficient obtained by multiplying the attenuation coefficient c by a value of a monotonously decreasing function (for example, 1−d/D) such that the attenuation coefficient c becomes 0 at the marginal distance D may be adopted.

In addition, although the voltage value indicative of the amplitude is decreased with using the attenuation coefficient c irrespective of the value of the frequency of the vibration data in this first embodiment, it does not need to be limited to this. When the value of the frequency is large, an attenuation amount of the vibration (attenuation rate) is large in comparison with a case where the value of the frequency is small, and therefore, an attenuation coefficient obtained by multiplying the attenuation coefficient c by a value of another function that increases the attenuation rate of the vibration as the frequency becomes higher may be adopted. In this case, a value of the above-described monotonically decreasing function may be further multiplied.

Moreover, since the vibration data is calculated for each of the reception portion L and the reception portion R, the attenuation coefficient c is also calculated for each of the reception portion L and the reception portion R. In the following, when each attenuation coefficient c needs to be distinguished, the attenuation coefficient c for calculating the vibration data for the reception portion L (hereafter, may be called "left side vibration data") is expressed as an attenuation coefficient $c_L$, and the attenuation coefficient c for calculating the vibration data for the reception portion R (hereafter, may be called "right side vibration data") is expressed as an attenuation coefficient $c_R$.

As described above, in the example shown in FIG. 12 (and FIG. 14 described later), the reception portion L and the reception portion R are set based on positions of the left hand and the right hand of the player object 202. In addition, although the reception portion L and the reception portion R are set as the same positions as the left hand and the right hand of the player object 202 in the example shown in FIG. 12, it does not need to be limited to this. For example, like an example of FIG. 14 described later, the reception portion L and the reception portion R may be set in positions that are determined based on the left hand and the right hand of the player object 202 but other than positions of the left hand and the right hand.

Moreover, when the player object 202 does not have the left hand and the right hand, predetermined parts provided on left and right of the player object may be regarded as the left hand and the right hand, and the reception portion L and the reception portion R may be set based on the positions of the predetermined parts. For example, when the player object 202 is an object imitating an automobile, the reception portion L and the reception portion R may be set in positions of left and right wheels (front wheels or rear wheels), or positions of left and right headlights.

Moreover, when the player object 202 has a sword object or/and a shield object, drawing processing of the hand of the player object 202 may be omitted. In such a case, the reception portion L and the reception portion R may be set in positions equivalent to the left hand and the right hand of the player object 202. Specifically, the reception portion L (or the reception portion R) may be set in a position corresponding to a handle of the sword object, and the reception portion R (or the reception portion L) may be set in a position corresponding to a handle of the shield object.

Figure 14:
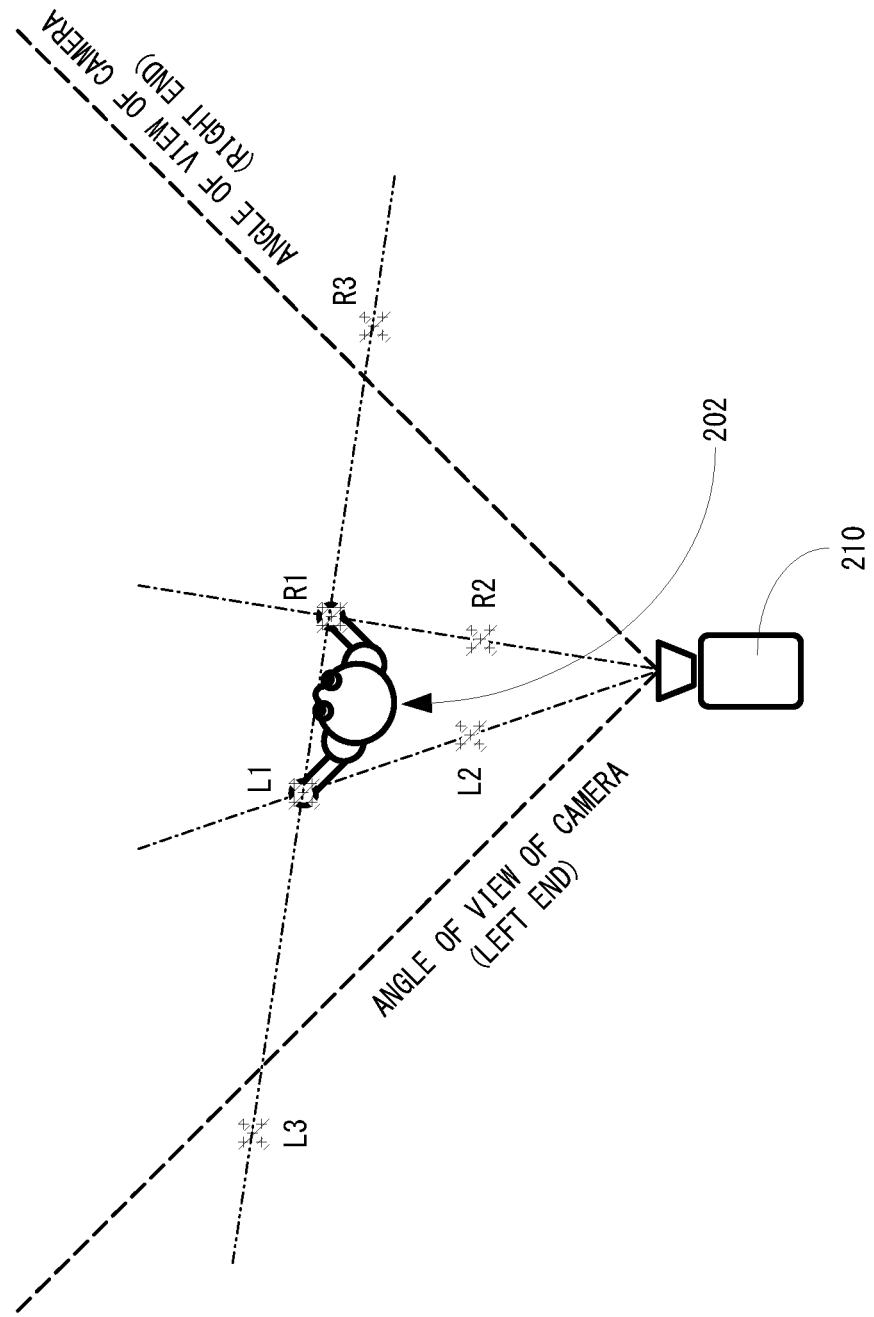
FIG. 14 is an illustration view showing another non-limiting example setting method of a vibration source and a reception portion in the virtual space.

FIG. 14 is an illustration view showing another non-limiting example setting method of the reception portion L and the reception portion R in the virtual space. FIG. 14 shows an example of a case where the reception portion L and the reception portion R are set in positions other than positions of the left hand and the right hand while using the positions of the left hand and the right hand of the player object 202.

In addition, in the example shown in FIG. 14, as described above, the reception portion L and the reception portion R that are set in the positions of the hands of the player object 202 are expressed as a reception portion L1 and a reception portion R1, and the reception portion L and the reception portion R that are set in positions other than the hands of the player object 202 are expressed by adding another numeral(s), whereby the reception portion L and the reception portion R set in different positions are made discernible. In the following, in the first embodiment, in order to distinguishably express the reception portion L and the reception portion R that are set in different positions, similarly, the added numeral(s) is changed.

As shown in FIG. 14, a reception portion L2 may be set in a position on a straight line passing through a position of the virtual camera 210 (view point position) and a position of the left hand of the player object 202, and a reception portion R2 may be set in a position on a straight line passing through the view point position and a position of the right hand of the player object 202. For example, although the position of the reception portion L2 is a middle point between the view point position and the position of the left hand of the player object 202 and the position of the reception portion R2 is a middle point between the view point position and the position of the right hand of the player object 202, it does not need to be limited to the middle point.

Moreover, as shown in FIG. 14, a reception portion L3 and a reception portion R3 may be set in positions on a straight line passing through the position of the left hand and the position of the right hand of the player object 202 except for the position of the left hand and the position of the right hand. In the example shown in FIG. 14, the reception portion L3 is set on an outer side (left side) from the left end of the angle of view of the virtual camera 210, and the reception portion R3 is set on an outer side (right side) of the right end of the angle of view of the virtual camera 210. However, this is an example, and the reception portion L3 may be set in a position on a line at the left end of the angle of view, or may be set in a position between the left end of the angle of view and the left hand of the player object 202. Similarly, the reception portion R3 may be set in a position on a line at the right end of the angle of view, or may be set in a position between the right end of the angle of view and the right hand of the player object 202.

In addition, as described above, in a case where the player object 202 is an automobile, the reception portions L2 and L3 and the reception portion R2 and R3 may be set based on the positions of left and right wheels or the positions of left and right headlights.

Figure 15:
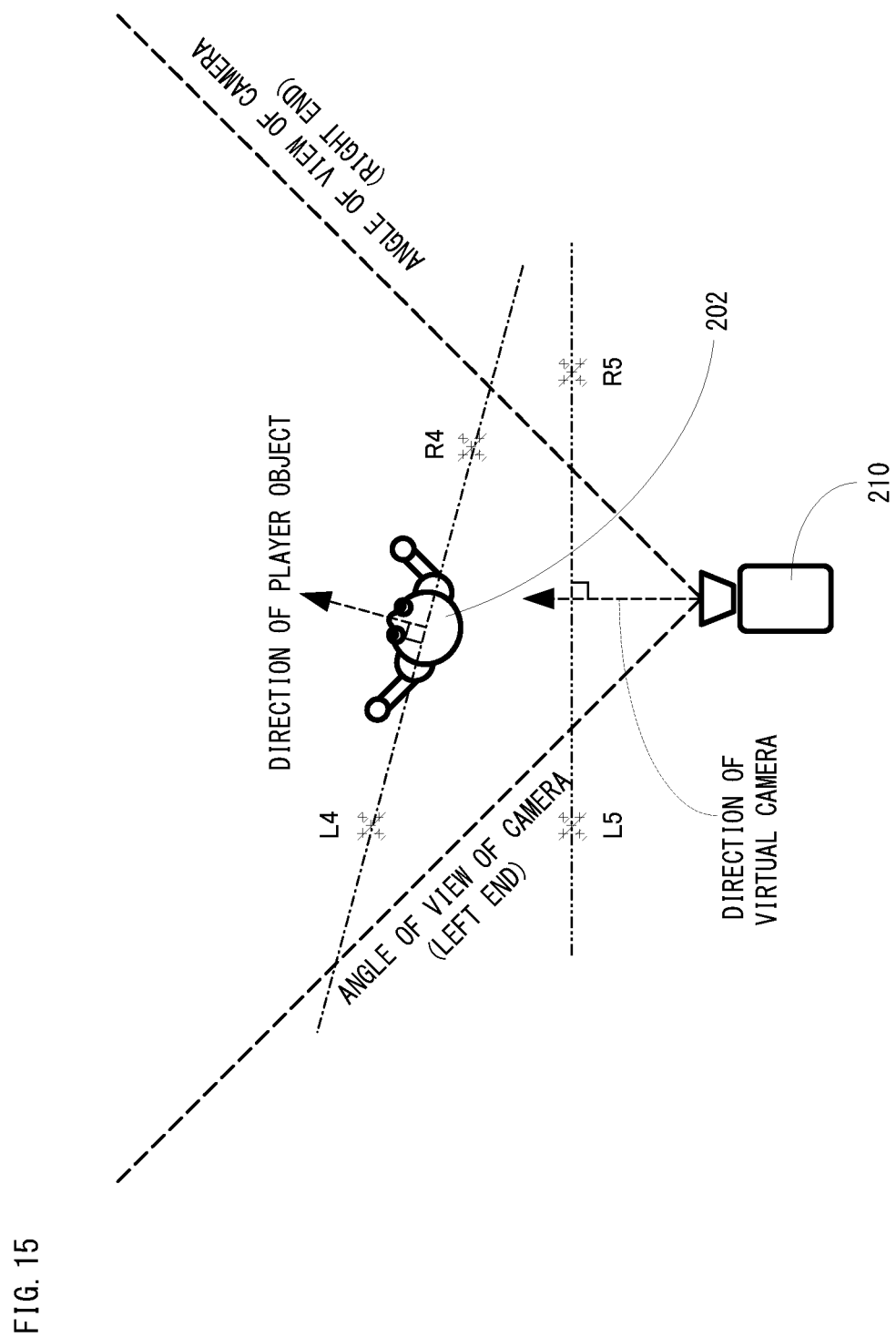
FIG. 15 is an illustration view showing a further non-limiting example setting method of a vibration source and a reception portion in the virtual space.

FIG. 15 is an illustration view showing a further non-limiting example setting method of the reception portion L and the reception portion R in the virtual space. FIG. 15 shows an example of a case where the reception portion L and the reception portion R are set without relation to positions of the left hand and the right hand of the player object 202. Specifically, in the example shown in FIG. 15, the reception portion L and the reception portion R are set according to a direction of the player object 202 or a direction of the virtual camera 210.

As shown in FIG. 15, a reception portion L4 and a reception portion R4 may be set on left and right points on the basis of the player object 202 on a plane orthogonal to a direction to which a face or a body of the player object 202 is turned. In the example shown in FIG. 15, the reception portion L4 is set in a position between the left end of the angle of view of the virtual camera 210 and the player objects 202, and the reception portion R4 is set in a position between the right end of the angle of view of the virtual camera 210 and the player objects 202. However, the reception portion L4 may be set on a line at the left end of the angle of view, or may be set outside (left side) the left end of the angle of view. The reception portion R4 may be set on a line at the right end of the angle of view, or may be set outside (right side) the right end of the angle of view.

In addition, as described above, in a case where the player object 202 is an automobile or airplane, the reception portion L4 and the reception portion R4 may be set on left and right points on the basis of the automobile or airplane on a plane orthogonal to an advancing direction of the automobile or airplane.

Moreover, as shown in FIG. 15, a reception portion L5 and a reception portion R5 may be set on left and right points on the basis of the position of the virtual camera 210 (view point position) on a plane orthogonal to a direction to which the virtual camera 210 is turned (camera direction). In the example shown in FIG. 15, the reception portion L5 is set in a position outside (left side) the left end of the angle of view of the virtual camera 210, and the reception portion R5 is set in a position outside (right side) the right end of the angle of view of the virtual camera 210. However, the reception portion L5 may be set on a line at the left end of the angle of view of the virtual camera 210, or may be set in a position between the left end of the angle of view of the virtual camera 210 and the virtual camera 210. Moreover, the reception portion R5 may be set on a line at the right end of the angle of view of the virtual camera 210, or may be set in a position between the right end of the angle of view of the virtual camera 210 and the virtual camera 210. When setting the reception portion L and reception portion R based on the position of the hand of the player object 202 or the direction of the player object 202, it is possible to make the player feel the vibration that the player object 202 feels, and thus, it is possible to give the player impression that the player himself/herself has become the player object 202 and thus to enhance presence of the game. Moreover, when setting the reception portion L and the reception portion R based on the direction of the virtual camera 210, by expressing the vibration perceived by the player operating the player object 202 from behind, it is possible to give the impression that the player himself/herself is in the virtual space.

By setting the positions of the reception portion L and the reception portion R in the example shown in FIG. 15, it is possible to calculate the positions of the reception portion L and the reception portion R without increasing a calculation processing load even when the positions of the hands of the player object 202 change rapidly and thus the distances $d_L$ and $d_R$ frequently change in a short time. By setting of the reception portion L and the reception portion R based on the direction of the virtual camera 210, it is possible to calculate the positions of the reception portion L and the reception portion R without increasing a calculation processing load even when the position and direction of the player object 202 frequently change. Moreover, not for a purpose of reducing the calculation processing load, there is a case where the reception portion L and the reception portion R are set irrespective of the position of the hands of the player object 202 in accordance with the impression that the developer, etc. wish the player to have.

In the above, a plurality of non-limiting examples for setting the reception portion L and the reception portion R in the virtual space were described with using FIG. 12, FIG. 14 and FIG. 15. It is considered in general as follows: in a case where the distance $d_L$ and the distance $d_R$ are not identical, when the distance between the reception portion L and the reception portion R becomes long, as a result, a difference between the left side vibration data that is applied to the vibration motors 82b and 162b and the right side vibration data that is applied to the vibration motors 102b and 164b becomes large, whereby a stereo effect can be emphasized. The degree of emphasis or suppression of the stereo effect is set in consideration of a balance with a game experience, and based on it, the reception portion L and the reception portion R are set in optimal positions for each game or for each scene in the game.

Figure 16:
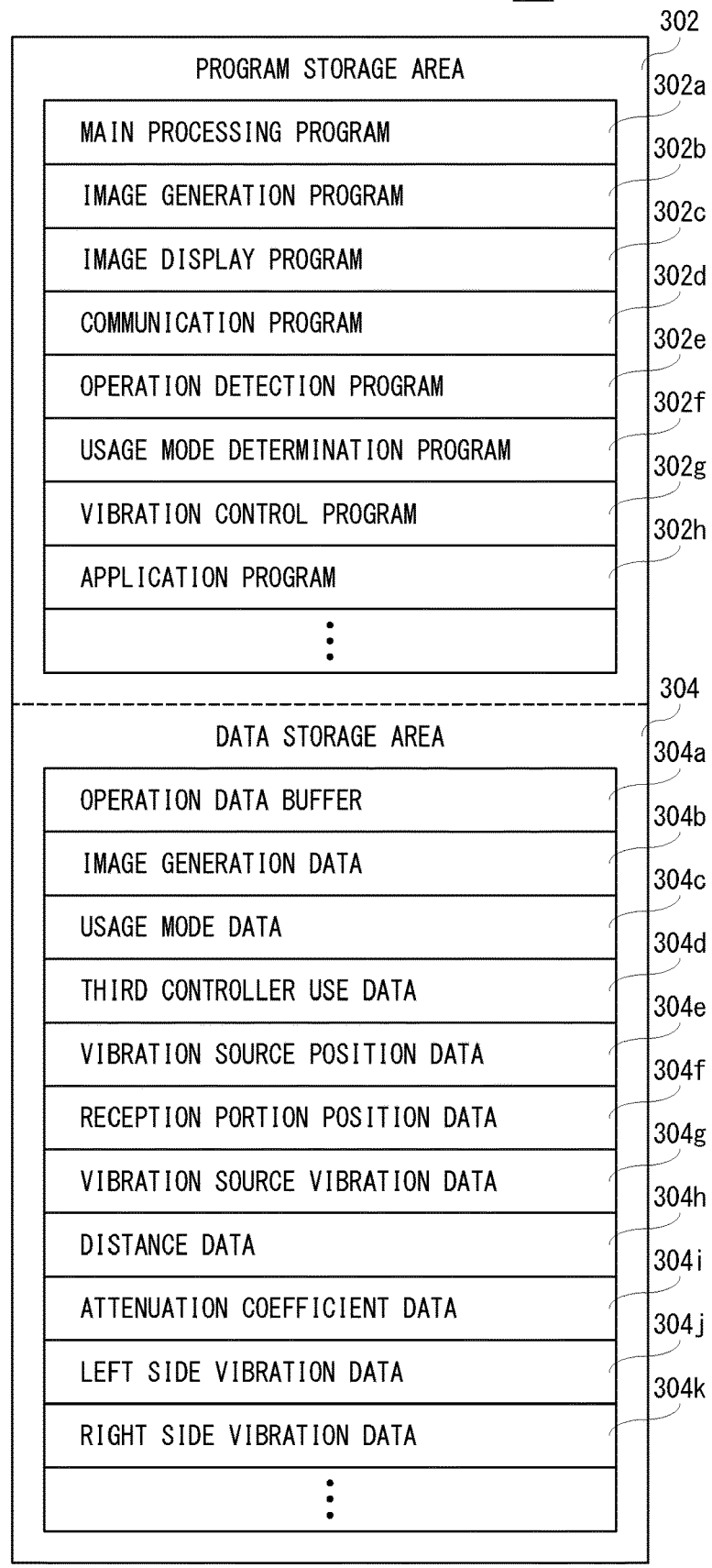
FIG. 16 is an illustration view showing a non-limiting example memory map of a RAM of the game apparatus shown in FIG. 3.

FIG. 16 is an illustration view showing a non-limiting example memory map 300 of the RAM 22 shown in FIG. 3. As shown in FIG. 16, the RAM 22 includes a program storage area 302 and a data storage area 304. Various programs are stored in the program storage area 302. Various programs may be partly or entirely read from the flash memory 24 at a proper timing after a power supply of the game apparatus 10 is turned on, and stored in the RAM 22.

In addition, in replace with the flash memory 24, various programs may be acquired from a memory or an optical disk attachable/detachable to or from the game apparatus 10, and when the game apparatus 10 is provided with a function of communication with other information processing apparatus (computers), various programs may be acquired (downloaded) directly or via a network from the other information processing apparatus.

As shown in FIG. 16, the program storage area 302 is stored with a main processing program 302a, an image generation program 302b, an image display program 302c, a communication program 302d, an operation detection program 302e, a usage mode determination program 302f, a vibration control program 302g, an application program 302h, etc.

The main processing program 302a is a program (operating system) for processing a main routine of an operation of the game apparatus 10. The image generation program 302b is a program for generating image data corresponding to images to be displayed on the display 12 with using image generation data 304b including polygon data, texture data, etc. The image display program 302c is a program for outputting the image data generated according to the image generation program 302b to the display 12.

The communication program 302d is a program for performing transmission and reception of the data (communication) with controllers such as the first controller 14, the second controller 16 and the third controller 120. The operation detection program 302e is a program for detecting operation data from the controllers such as the first controller 14, the second controller 16 and the third controller 120 and for storing the operation data in an operation data buffer 304a. However, information capable of individually identifying the controller is added to the operation data transmitted from each of the controllers.

The usage mode determination program 302f is a program for determining the usage mode of the game apparatus 10. However, the usage mode determination program 302f determines also whether the third controller 120 is to be used. That is, the usage mode determination program 302f, determines the usage mode (connection manner) of the first controller 14, the second controller 16, and the further controller (the third controller 120) different from these controllers.

The vibration control program 302g is a program for controlling the drive of the vibration motors 82b, 102b, 162b and 164b (14c, 16c, 120c) provided in the controllers (14, 16, 120) communicably connected to the main body apparatus 10a in response to a request from the application program 302h. In cases of the first mode-third mode in this first embodiment, the left side vibration data 304j for making the vibration motor 82b of the first controller 14 be driven is input from the application program 302h to the operating system, and the right side vibration data 304k for making the vibration motor 102b of the second controller 16 be driven is input from the application program 302h to the operating system. Moreover, in a case of the fourth mode, the left side vibration data 304j for making the vibration motor 162b of the third controller 120 be driven is input from the application program 302h to the operating system, and the right side vibration data 304k for making the vibration motor 164b of the third controller 120 be driven is input from the application program 302h to the operating system.

The application program 302h is a program about applications such as a game, as described above. However, in this first embodiment, the operating system may be requested (demanded) to present the vibration and the vibration data may be input to the operating system during execution of the application program 302h. However, when presenting vibration, the left side vibration data 304j and the right side vibration data 304k corresponding to the vibration conveyed to each of the reception portion L and the reception portion R are calculated according to Equation 1 from the vibration data (vibration source vibration data 304g) corresponding to the vibration that is generated the vibration source VS. At this time, the distance $d_L$ between the vibration source VS and the reception portion L and the distance $d_R$ between the vibration source VS and the reception portion R are calculated, and the attenuation coefficient $c_L$ for calculating the vibration to be conveyed to the reception portion L and the attenuation coefficient $c_R$ for calculating the vibration to be conveyed to the reception module R are also calculated. Moreover, in this specification, the application program 302h means programs not included in the main body functions.

In addition, although illustration is omitted, the program storage area 302 is also stored with a program for a further main body function performing transmission/reception of messages. Moreover, other application programs different from the application program 302h may be stored in the program storage area 302.

In the data storage area 304, the operation data buffer 304a, the image generation data 304b, usage mode data 304c, third controller use data 304d, vibration source position data 304e, reception portion position data 304f, vibration source vibration data 304g, distance data 304h, attenuation coefficient data 304i, left side vibration data 304j, right side vibration data 304k, etc. are stored.

The operation data buffer 304a is stored with the operation data detected by the operation data detection program 302e according to time series. The image generation data 304b is data for generating image data corresponding to images (screen(s) such as the game screen 200 etc.) to be displayed on the display 12, such as polygon data, texture data, etc.

The usage mode data 304c is a data about the usage mode of the game apparatus 10 determined according to the usage mode determination program 302f. For example, the usage mode data 304c consists of a 2-bit register, and "00" is set to the register when the first mode is determined, "01" is set to the register when the second mode is determined, "10" is set to the register when the third mode is determined, and "11" is set to the register when the fourth mode is determined.

The third controller use data 304d is a data for determining whether the third controller 120 is to be used. The vibration source position data 304e is data about a position (coordinates) of the vibration source VS that is arranged (appears) in the virtual space by executing the application program 302h. The reception portion position data 304f is data about a position (coordinates) for each of the reception portion L set and the reception portion R that are set in the virtual space by executing the application program 302h.

The vibration source vibration data 304g is vibration data corresponding to the vibration that is generated from the vibration source VS by executing the application program 302h. The distance data 304h is data about the distance $d_L$ between the vibration source VS and the reception portion L, and data about the distance $d_R$ between the vibration source VS and the reception portion R. The attenuation coefficient data 304i is data about the attenuation coefficient $c_L$ for calculating the vibration to be conveyed to the reception portion L, i.e., the left side vibration data 304j that drives the vibration motor 82b or the vibration motor 162b, and the attenuation coefficient $c_R$ for calculating the vibration to be conveyed to the reception portion R, i.e., the right side vibration data 304k that drives the vibration motor 102b or the vibration motor 164b.

The left side vibration data 304j is vibration data for making the vibration motor 82b or the vibration motor 162b be driven. The right side vibration data 304k is vibration data for making the vibration motor 102b or the vibration motor 164b be driven.

Although illustration is omitted, the data storage area 304 is stored with other data necessary for controlling the operation of the game apparatus 10, and provided with a counter(s) (timer(s)) required for the game processing.

Figure 17:
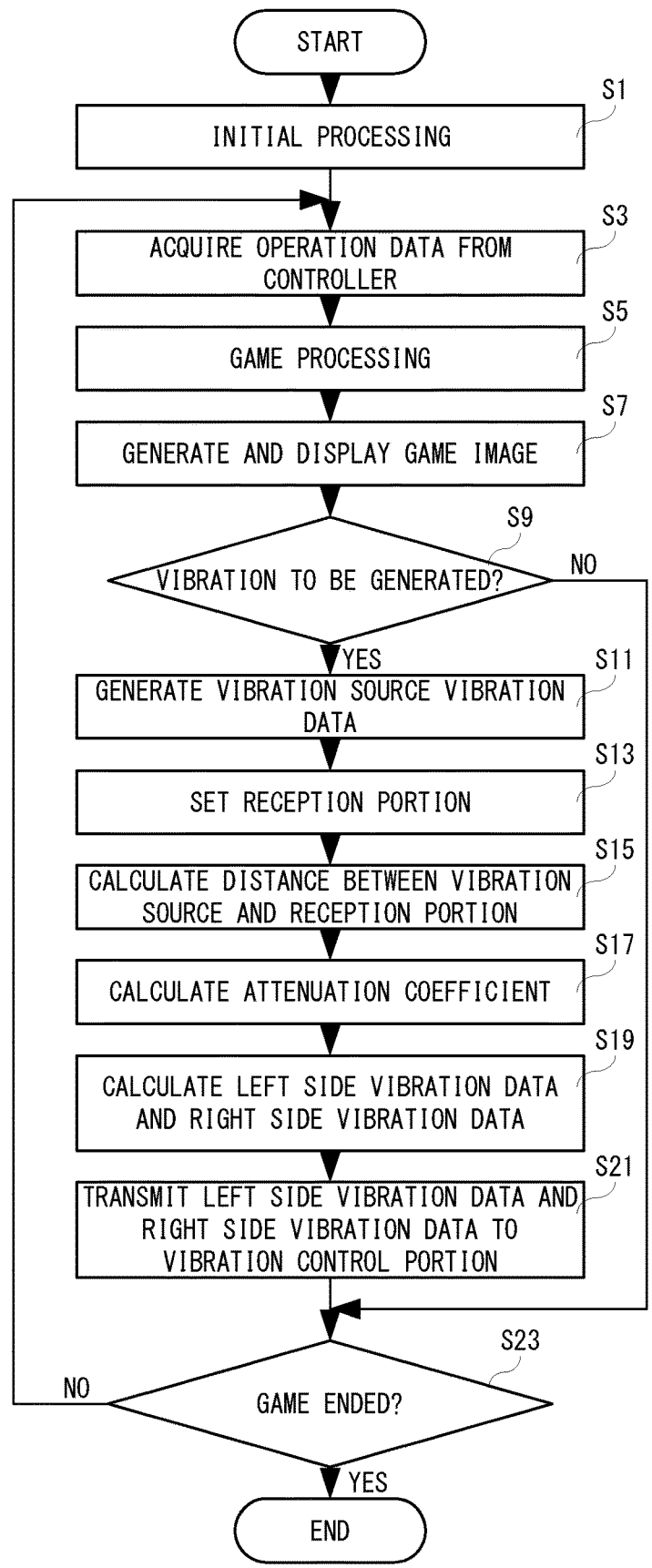
FIG. 17 is a flow chart showing non-limiting example entire game processing of a CPU shown in FIG. 3.

FIG. 17 is a flow chart showing non-limiting example entire game processing of the CPU 20 shown in FIG. 3. For example, the entire game processing is performed according to a game application program (here, application program 302h). In addition, although this first embodiment will be explained on a case where the processing of the respective steps of the flow chart shown in FIG. 17 (also in FIG. 18) are basically performed by the CPU 20, processors other than the CPU 20 or dedicated circuits may be made to perform some steps.

When execution of the application program is instructed by the player, the CPU 20 starts the entire game processing, and performs initial processing in a step S1. In the initial processing, for example, the CPU 20 constructs a virtual space for generating and displaying the game screen 200, and arranges respective character or objects such as the player character 202, the enemy object 204, etc. appearing in this virtual space at their initial positions. Moreover, the CPU 20 sets initial values of various parameters used in the game processing (S5).

In addition, although a detailed description is omitted here, prior to the start of the entire game processing, a usage mode of the game apparatus 10 is determined. However, prior to the usage mode of the game apparatus 10 is determined, it is determined whether the main body apparatus 10a is attached with the first controller 14 and the second controllers 16, and when the first controller 14 and the second controller 16 are detached from the main body apparatus 10a, pairing processing is performed between the main body apparatus 10a and each of the first controller 14, the second controller 16 and a further controller (the third controller 120). If the usage mode of the game apparatus 10 is determined, the usage mode data 304c according to the determined usage mode is stored in the data storage area 304. The third controller use data 304d according to whether the third controller 120 is used is stored in the data storage area 304.

Subsequently, the CPU 20 acquires the operation data that is transmitted from the controller (14, 16, 120) in a step S3, and performs a game processing in a step S5. For example, in the game processing, arbitrary actions of moving the player object 202 according to the operation data, etc. is performed. Moreover, arbitrary actions of moving the enemy object 204 according to the application program 302h, etc. is performed. Furthermore, the item is made to appear (be arranged) in the virtual space as necessary. Furthermore, the vibration source VS is made to generate the vibration, as necessary.

In a next step S7, the CPU 20 and the GPU generate and display a game image to be displayed on the display device 12. Briefly describing, the CPU 20 and the GPU read data indicating a result of the game processing in the step S5 and the image generation data 304b from the RAM 22, and generate game image data in the VRAM so as to output to the display device 12.

Subsequently, it is determined, in a step S9, whether vibration is to be generated from the vibration source VS. If "NO" is determined in the step S9, that is, if vibration is not to be generated from vibration source VS, the process proceeds to a step S23. On the other hand, if "YES" is determined in the step S9, that is, if vibration is to be generated from the vibration source VS, the vibration source vibration data 304g is generated in a step S11. Here, the CPU 20 stores the vibration data (vibration source vibration data 304g) corresponding to the vibration to be generated from the vibration source VS in the data storage area 304. As described above, the vibration source vibration data 304g may be generated by the CPU 20, or the vibration source vibration data 304g that is stored in advance in the flush memory 24 may be read by the CPU 20. Moreover, at this time, data of the position of the vibration source VS in the virtual space (vibration source position data 304e) is also stored in the data storage area 304.

In a subsequent step S13, the reception portion L and the reception portion R are set. The reception portion L and the reception portion R are set in the virtual space through any one of the above-described methods. At this time, data about each of the position of the reception portion L and the position of the reception portion R (reception portion position data 304f) is stored in the data storage area 304.

Next, in a step S15, the distance $d_L$ between the vibration source VS and the reception portion L, and the distance $d_R$ between the vibration source VS and the reception portion R are calculated. At this time, the data about the distance $d_L$ and the distance $d_R$ (distance data 304h) are stored in the data storage area 304. Subsequently, in a step S17, the attenuation coefficient c is calculated. Here, the attenuation coefficient $c_L$ for the reception portion L and the attenuation coefficient $c_R$ for the reception portion R are calculated, and the data of the attenuation coefficient $c_L$ and the attenuation coefficient $c_R$ (attenuation coefficient data 304i) are stored in the data storage area 304.

Then, in a step S19, the left side vibration data 304j and the right side vibration data 304k are calculated according to Equation 1. That is, the vibration data corresponding to the vibration that is generated in the vibration source VS so as to be conveyed to the reception portion L and the reception portion R is calculated. The left side vibration data 304j and the right side vibration data 304k thus calculated are stored in the data storage area 304.

In a next step S21, the left side vibration data 304j and the right side vibration data 304k are transmitted to a vibration control portion (operating system). At this time, an instruction to vibrate the controller (14, 16, 120) is also transmitted to the vibration control portion. Then, it is determined, in the step S23, whether the game is ended. Determination in the step S23 is performed according to whether it becomes the game over, or whether an instruction to stop the game is input by the player, for example. If "NO" is determined in the step S23, that is, if the game is not to be ended, the process returns to the step S3. On the other hand, if "YES" is determined in the step S23, that is, if the game is to be ended, the entire game processing is terminated.

Figure 18:
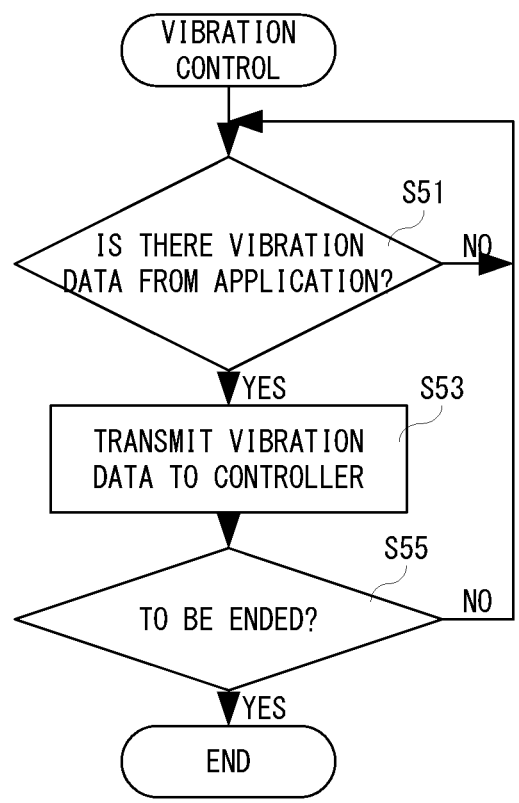
FIG. 18 is a flow chart showing non-limiting example vibration control processing of the CPU shown in FIG. 3.

FIG. 18 is a flow chart showing non-limiting example vibration control processing of the CPU 20 shown in FIG. 3. For example, if requested (commanded) from the application program to generate the vibration, the CPU 20 starts the vibration control processing. However, the vibration control processing is concurrently performed for the left side vibration data 304*j* and the right side vibration data 304*k*.

As shown in FIG. 18, when starting the vibration control processing, the CPU 20 determines, in a step S51, whether vibration data is input from the application program. If "NO" is determined in the step S51, that is, if the vibration data is not input from the application program, the process returns to the step S51.

On the other hand, if "YES" is determined in the step S51, that is, if the vibration data is input from the application program, the vibration data (the left side vibration data 304*j* or the right side vibration data 304*k*) is transmitted to the corresponding controller (14, 16, 120) in a step S53. Therefore, in the controller (14, 16, 120) that received the vibration data, the vibration motor (82*b*, 102*b*, 162*b*, 164*b*) is driven according to the vibration data. Accordingly, the vibration motor (82*b*, 102*b*, 162*b*, 164*b*) outputs (vibrates) with a pattern according to a vibration signal.

Then, it is determined, in a step S55, whether it is to be ended. Here, the CPU 20 determines whether the application containing the processing that presents the vibration is ended, or whether a scene that presents the vibration in that application is ended. If "NO" is determined in the step S55, that is, if not to be ended, the process returns to the step S51. On the other hand, if "YES" is determined in the step S55, that is, if to be ended, the vibration control processing is terminated.

According to this first embodiment, since the vibration that is to be conveyed to two reception portions at a left side and a right side from the vibration source is calculated based on a space situation between the vibration source and the reception portion at the left side and based on a space situation between the vibration source and the reception portion at the right side so as to make the left and right vibration portions vibrate, respectively, it is possible to present the vibration according to various situations in the virtual space.

Moreover, according to the first embodiment, since the left and right vibration portions are made to vibrate, respectively, a stereo effect of the vibration can be obtained. Therefore, since the player not only views the game screen and the game sound but also perceives the vibration, the player can feel high immersion in the game.

In addition, in this first embodiment, in order to attenuate the vibration in inverse proportion to the square of distance, the voltage value is decreased (changed), but it does not need to be limited to this. The frequency may be changed according to the situation of the virtual space. For example, when the player object 202 approaches the vibration source VS (distance is short), the frequency may be heightened, and when the player object 202 keeps away from the vibration source VS (distance is long), the frequency may be lowered. Moreover, in also a case where a state of the player object 202 is changed, the frequency may be changed. For example, in a case where a size of the player object 202 is changed, when the player object becomes large, the frequency may be decreased, and when the player object 202 becomes small, the frequency may be increased. Moreover, in a case where the player object 202 is changed between a normal state receiving a damage and an invincible state receiving no damage when the player object 202 receives an attack of the enemy object 204, when changed to the invincible state, the frequency may be made higher than that of the normal state, and when changed to the normal state, the original frequency may be restored. However, a change in the frequency may be changed inversely with the above-described case. Thus, the vibration data can be changed according to the state of the player object 202. Therefore, as described above, when changing the attenuation rate of the amplitude according to the frequency, it is possible to change the frequency according to the state of the player object 202. That is, it can be said that the attenuation rate (changing rate) is changeable according to the state of the player object 202.

Moreover, when a state of the enemy object 204 as the vibration source VS changes, the vibration data corresponding to the vibration that is generated from the vibration source VS may be changed. A method of changing the vibration data is the same as that of a case where the state of the player object 202 is changed.

Thus, the vibration data is changed according to the state of the player object 202 or/and the enemy object 204. That is, the vibration data is changed according to the state of the object arranged in the virtual space. Therefore, it is possible to say that the state of the object arranged in the virtual space is also the space situation.

Furthermore, although the vibration that is generated in the vibration source VS is attenuated in inverse proportion to the square of distance ($d_L$, $d_R$) between the vibration source VS and the reception portion (L, R) in this first embodiment, it does not need to be limited to this. For example, in a situation where the reception portion L1 is set on the left hand of the player object 202 and the reception portion R1 is set on the right hand of the player object 202, and the player object 202 has a rod-like object such as a sword object in the right hand (or left hand), when the rod-like object is brought into contact with the vibration source VS, the vibration that is generated in the vibration source VS is attenuated in inverse proportion to the distance. That is, a conveyance medium includes an object (thing) interposed between the vibration source VS and the reception portion L, and an object (thing) interposed between the vibration source VS and the reception portion R. However, the conveyance medium does not need to be limited to the object (thing) interposed between the vibration source and the reception portion. When expressing a meteorology in the virtual space, the attenuation rate may be changed according to change of temperature or/and atmospheric pressure, phenomenon in the atmospheric air, etc. Therefore, the atmospheric air in the virtual space may be included in the conveyance medium. For example, the phenomenon in the atmospheric air may be one or more of cloud formation, rainfall and wind generation.

Furthermore, although this first embodiment is described with a case where the game apparatus 10 is used in any one of the first mode-fourth mode, and in the second mode-fourth mode, the game apparatus 10 is used while communicably connecting the controller (14, 16, 120) and the main body apparatus 10*a* to each other. Moreover, in such a case, it is possible to output the game screen and the game sound from a television receiver by connecting the main body apparatus 10*a* with the television receiver through a charge stand. Therefore, it is possible to say that a game system comprising the main body apparatus 10*a* and the controller (14, 16, 120) is constituted when the game apparatus 10 is used in any one of the second mode—the fourth mode.

Moreover, since the main body apparatus 10a functions also as a vibration control apparatus as described above, the game system functions also as a vibration control system.

Second Embodiment

Since a game apparatus 10 of the second embodiment is the same as that of the first embodiment except for a calculation method the left side vibration data and the right side vibration data, different contents will be described and a duplicate description will be omitted.

Figure 19:
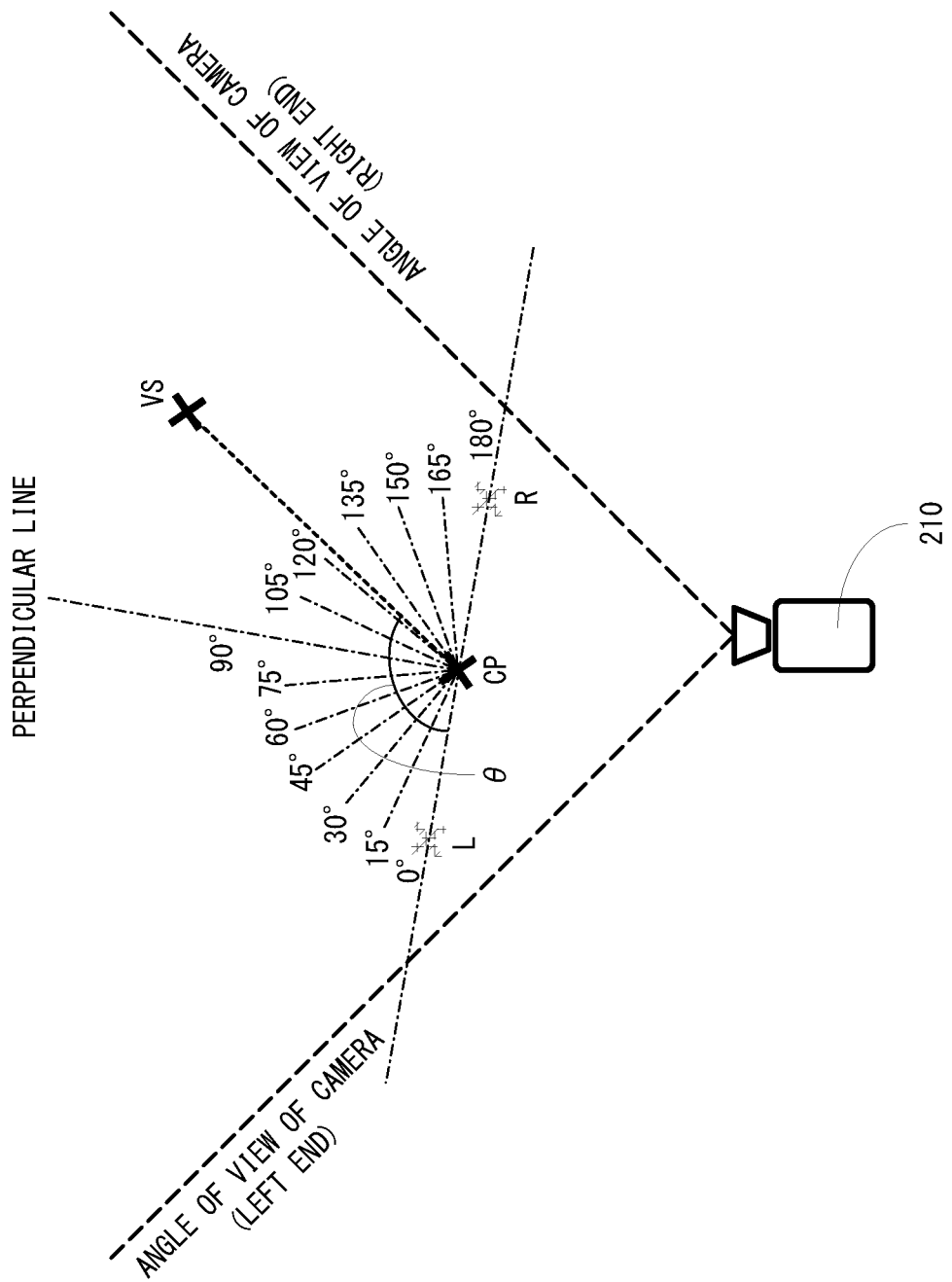
FIG. 19 is an illustration view showing a non-limiting example calculation method of vibration that is conveyed to a reception portion from a vibration source in a second embodiment.

FIG. 19 is an illustration view showing a non-limiting example calculation method of vibration data corresponding to vibration that is conveyed to the reception portion L and the reception portion R from the vibration source VS in a second embodiment. In also the second embodiment, as similar to the first embodiment, the vibration source VS is set on a predetermined character or object such as the enemy object 204. Moreover, in also the second embodiment, the reception portion L and the reception portion R may be set in positions (L1, R1) of the hands of the player object 202, positions (L2, R2) on the basis of the positions of the hands of the player object 202, other positions (L3, R3) on the basis of the positions of the hands of the player object 202, positions (L4, R4) based on a direction of the player object 202 (direction of a face or a body of the player object 202), or positions (L5, R5) based on a direction of the virtual camera 210. In addition, in FIG. 19, the player object 202 is omitted.

In this second embodiment, when the vibration source VS, the reception portion L and the reception portion R are set, the middle point CP between positions of the reception portion L and the position of the reception portion R is calculated. The attenuation coefficient c is calculated according to an angle θ (theta) that is formed by a straight line connecting the vibration source VS and the middle point CP with respect to a straight line passing through the reception portion L and the reception portion R. An example of a case of calculating the attenuation coefficient $c_L$ about the reception portion L is shown in FIG. 19. In this case, as shown also in FIG. 19, a direction viewing the reception portion L from the middle point CP is set as 0 (zero) degree, and a direction viewing the reception portion R from the middle point CP is set as 180 degrees.

A function f that satisfies all of the following conditions (1)-(3) is used to calculate the attenuation coefficient c.

(1) A domain is [0 degree, 180 degrees].
(2) In the domain, the function f is a broadly monotonously decreasing function.
(3) f (0 degree)<=1 and f (180 degrees)>=0.

Figure 20:
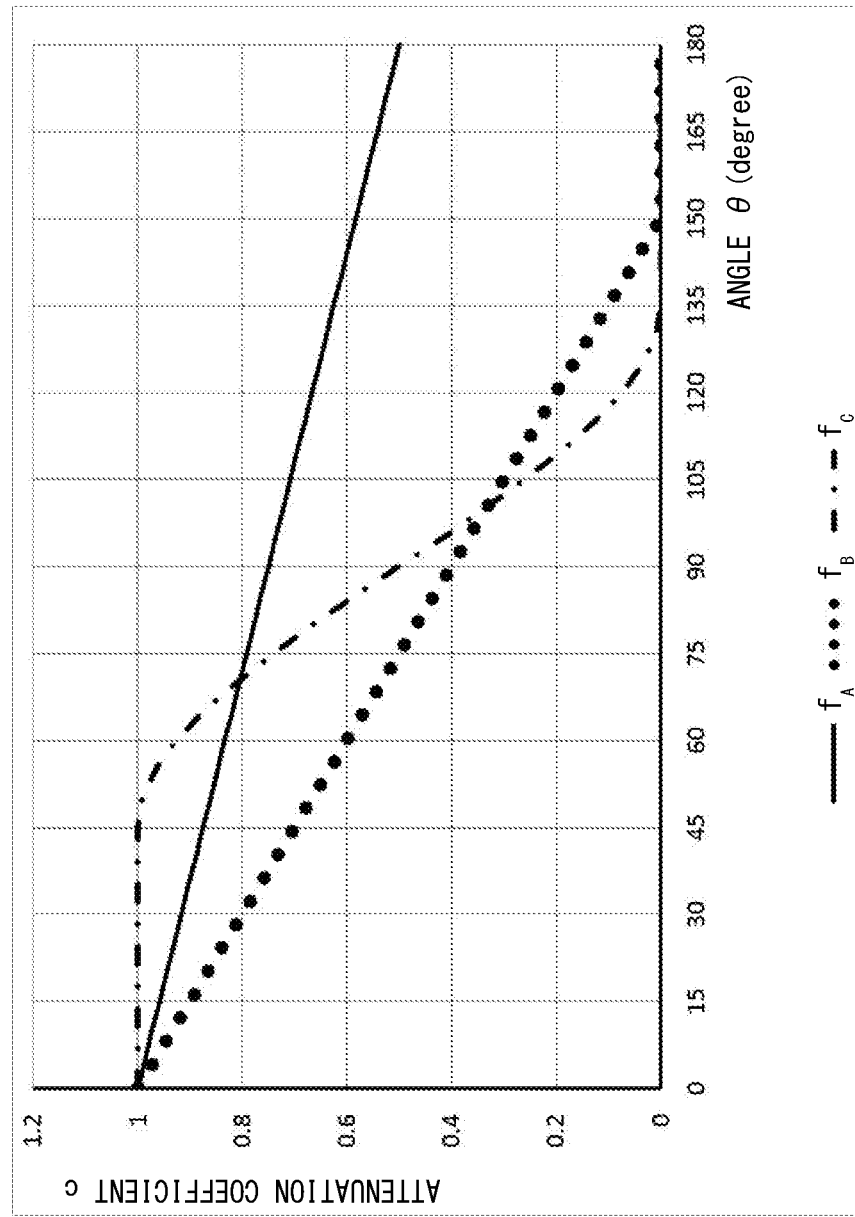
FIG. 20 is an illustration view showing a non-limiting example graph that indicates a change of an attenuation coefficient according to an angle of a straight line connecting a middle point of left and right vibration portions and the vibration source with respect to a straight line passing through left and right reception portions, when calculating the vibration that is conveyed to the reception portion from the vibration source in the second embodiment.

FIG. 20 shows a non-limiting graph that indicates change of the attenuation coefficient c to the angle θ (theta) in a case of calculating by functions $f_A$, $f_B$ and $f_C$ each satisfying the conditions (1)-(3). In FIG. 20, change of the attenuation coefficient c calculated with the function $f_A$ is shown by a solid line, change of the attenuation coefficient c calculated with the function $f_B$ is shown by a broken line, and change of the attenuation coefficient c calculated with the function $f_C$ is shown by an alternate long and short dashes line. It should be noted that the function $f_A$ is represented by Equation 2, the function $f_B$ is represented by Equation 3 and the function $f_C$ is represented by Equation 4.

$$f_A(\theta) = 1 - \theta/360 \qquad \text{[Equation 2]}$$

As understood from FIG. 20, the function $f_A$ is a linear function, and thus, the simplest example. When using this function $f_A$, the attenuation coefficient c is calculated so that the vibration that is generated in the vibration source VS may be distributed to the reception portion L and the reception portion R according to the angle θ (theta).

$$f_B(\theta) = \max(1 - \theta/150, 0) \qquad \text{[Equation 3]}$$

The function $f_B$ makes the attenuation coefficient c to 0 (zero) when the angle θ (theta) exceeds a predetermined value (150 degrees in the second embodiment). In a case of the third mode or the fourth mode, the vibration of the left side vibration motor 82b or 162b is conveyed via a housing also to the right hand, for example. In such a usage mode, when the angle θ (theta) exceeds the predetermined value, by setting the attenuation coefficient c to 0 (zero), the vibration is hardly conveyed to the hand opposite to a side where the vibration is generated. That is, a difference between left vibration and right vibration is emphasized.

$$f_C(\theta) = \begin{cases} 1 & (\theta \leq 45°) \\ 0 & (\theta \geq 135°) \\ 2(x/90 - 0.5)^3 - 3(x/90 - 0.5)^2 & \text{(otherwise)} \end{cases} \qquad \text{[Equation 4]}$$

As also shown in FIG. 20, the function $f_C$ is a function that the attenuation coefficient c changes in an S-letter shape. Since an inclination of a graph is steep near 90 degrees of the angle θ (theta), there is an advantage that when a position of the vibration source VS changes in a transverse direction near the front of the player object 202, for example, the vibration is conveyed so that the change is emphasized.

Although illustration is omitted, when calculating the attenuation coefficient $c_R$ about the reception portion R, a direction viewing the reception portion R from the middle point CP is set to 0 (zero) degree, and a direction viewing the reception portion L from the middle point CP is set to 180 degrees. A calculation method of the attenuation coefficient $c_R$ is the same as that of the attenuation coefficient $c_L$.

In the second embodiment, the left side vibration data 304j and the right side vibration data 304k are calculated with using the attenuation coefficient $c_L$ and the attenuation coefficient $c_R$ that are calculated according to any one of the functions $f_A$-$f_C$. Therefore, although it differs strictly from a case where the left side vibration data 304j and the right side vibration data 304k are calculated by calculating the distance $d_L$ and the distance $d_R$, a stereo effect of the vibration can be approximately obtained in also the second embodiment.

According to the second embodiment, even if the distances between the vibration source and two reception portions are not calculated, it is possible to present the vibration according to various situations in the virtual space.

Third Embodiment

Since a game apparatus 10 of the third embodiment is the same as that of the first embodiment except for a method of setting the vibration source VS and each of the reception portion L and the reception portion R, different contents will be described and a duplicate description will be omitted.

The vibration source VS may be a line, plane or solid body rather than a point. Similarly, the reception portion L and the reception portion R each may be a line, plane or solid body rather than a point. In an example shown in FIG. 21, there are provided a vibration source VS1 and a vibration source VS2, and the reception portion L is set on the left hand of the player object 202, and the reception portion R is set on a thin rod-like tool (object) 206, such as a sword that the player object 202 has in the right hand.

The vibration source VS1 is a character or object of a rectangle or a rectangular parallelepiped, and in this case, a distance $d_{L1}$ between the vibration source VS1 and the reception portion L that is set on the left hand is determined to the shortest distance between the vibration source VS1 and the reception portion L, whereby an attenuation coefficient $c_{L1}$ is calculated. Similarly, a distance $d_{R1}$ between the vibration source VS1 and the reception portion R is determined to the shortest distance between the vibration source VS1 and the object 206, whereby an attenuation coefficient $c_{R1}$ is calculated.

Moreover, since the vibration source VS2 is a point and the reception portion L is also a point, an attenuation coefficient $c_{L2}$ is calculated, as similar to the first embodiment, with using a distance $d_{L2}$ between the vibration source VS2 and the reception portion L. A distance $d_{R2}$ between the vibration source VS2 and the reception portion R is determined to the shortest distance between the vibration source VS2 and the object 206, whereby an attenuation coefficient $c_{R2}$ is calculated.

Figure 21:
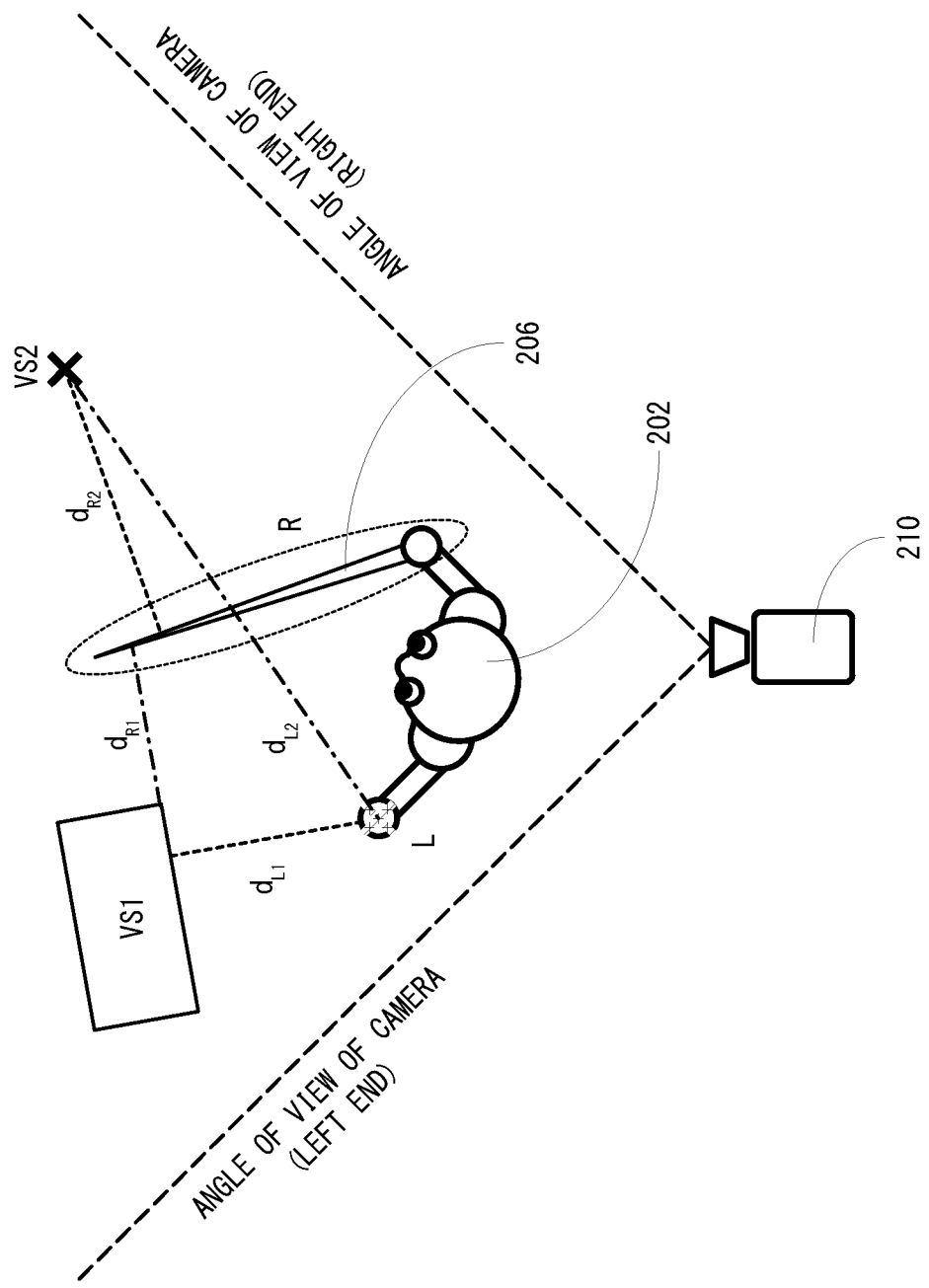
FIG. 21 is an illustration view showing a non-limiting example calculation method of a distance between a vibration source and a reception portion in a third embodiment.

Although the example shown in FIG. 21 is described on a case where a shape of the vibration source VS is the same as a shape of an object that is to be drawn in the game screen 200, these shapes do not need to be the same. For example, when the enemy object 204 is drawn as an object that generates vibration, a shape of the enemy object 204 as the vibration source VS may be approximated to a circle, a quadrangle, a sphere or a rectangular parallelepiped (cube). Similarly, a shape of each of the reception portion L and the reception portion R and a shape of a character or object corresponding to each of the reception portion L and the reception portion R to be drawn in the game screen 200 do not need to correspond to each other. For example, the object 206 may be approximated to a shape of a straight line, a rectangle, an ellipse or a rod (rectangular parallelepiped). That is, in order to reduce a calculation processing load, shapes of the vibration source VS, the reception portion L and the reception portion R can be simplified.

Therefore, even if it is a thick object like the vibration source VS1, as done in the first embodiment, the vibration source VS may be approximated only at a single point. Although the vibration source VS is approximated to a position of the enemy object 204 in the first embodiment, it is possible to approximate to a position of the center or the center of gravity of the enemy object 204. Moreover, in the example shown in FIG. 21, since the vibration source VS1 is a rectangle or a rectangular parallelepiped, it is possible to approximate the vibration source VS to a center point of a side nearest to the reception portion (L, R) on the rectangle or a center point of a plane nearest to the reception portion on the rectangular parallelepiped. Moreover, there is no necessity of being limited to the center of a geometric meaning, and the position of the vibration source VS may be approximated to a point that is easily recognized as a representative point when viewed from the viewpoint of the player after taking the context of a game into consideration. For example, when the vibration source VS is the enemy object 204, the position of vibration source VS can be approximated to a characteristic point (for example, a mouth or a nose) when viewing the enemy object 204.

When the vibration source VS1 and the vibration source VS2 do not generate vibration simultaneously, in any one of the first mode-third mode, the left side vibration data 304j that is calculated based on the vibration from the vibration source VS1 is applied to the vibration motor 82b, and the right side vibration data 304k that is calculated based on the vibration from the vibration source VS1 is applied to the vibration motor 102b. Moreover, in any one of the first mode-third mode, the left side vibration data 304j that is calculated based on the vibration from the vibration source VS2 is applied to the vibration motor 82b, and the right side vibration data 304k that is calculated based on the vibration from the vibration source VS2 is applied to the vibration motor 102b.

Moreover, when the vibration source VS1 and the vibration source VS2 do not generate vibration simultaneously, in the fourth mode, the left side vibration data 304j that is calculated based on the vibration from the vibration source VS1 is applied to the vibration motor 162b, and the right side vibration data 304k that is calculated based on the vibration from the vibration source VS1 is applied to the vibration motor 164b. Moreover, in the fourth mode, the left side vibration data 304j that is calculated based on the vibration from the vibration source VS2 is applied to the vibration motor 162b, and the right side vibration data 304k that is calculated based on the vibration from the vibration source VS2 is applied to the vibration motor 164b.

On the other hand, when the vibration source VS1 and the vibration source VS2 generate vibration simultaneously, in any one of the first mode-third mode, a synthesized left side vibration data 304j that is obtained by synthesizing the left side vibration data calculated based on the vibration from the vibration source VS1 and the left side vibration data calculated based on the vibration from the vibration source VS2 with each other is applied to the vibration motor 82b, and a synthesized right side vibration data 304k that is obtained by synthesizing the right side vibration data calculated based on the vibration from the vibration source VS1 and the right side vibration data calculated based on the vibration from the vibration source VS2 with each other is applied to the vibration motor 102b.

Moreover, when the vibration source VS1 and the vibration source VS2 generate vibration simultaneously, in the fourth mode, a synthesized left side vibration data 304j that is obtained by synthesizing the left side vibration data calculated based on the vibration from the vibration source VS1 and the left side vibration data calculated based on the vibration from the vibration source VS2 with each other is applied to the vibration motor 162b, and a synthesized right side vibration data 304k that is obtained by synthesizing the right side vibration data calculated based on the vibration from the vibration source VS1 and the right side vibration data calculated based on the vibration from the vibration source VS2 with each other is applied to the vibration motor 164b.

For example, when synthesizing the vibration data, a mean value of the frequency included in two pieces of vibration data is calculated, and a mean value of the voltage value included in two pieces of vibration data is calculated. However, since a plurality of sets of a frequency and a voltage value may be included in the vibration data, in this case, sets of the frequency and the voltage value included in each vibration data are arranged in an order according to the magnitude of the frequency (order of ascending or descending), and a mean value of sets of the same order is calculated. A synthesizing method is an example and does not need to be limited. When the vibration data is an analog vibration signal (vibration waveform), the vibration waveforms may be synthesized with each other.

Although a case where two vibration sources VS1 and VS2 generate the vibration simultaneously is described here, this is also applied to a case where the number of the vibration sources VS is three or more.

In also the third embodiment, similar to the first embodiment, it is possible to present the vibration according to various situations in the virtual space.

In addition, although omitted in the first embodiment and the second embodiment, as for a case where a plurality of vibration sources VS exist, the left side vibration data 304j and the right side vibration data 304k are calculated by synthesizing the vibration from the plurality of vibration sources VS, like a case shown in the third embodiment.

Fourth Embodiment

Since a game apparatus 10 of the fourth embodiment is the same as that of the first embodiment except that the vibration conveyed from the vibration source VS is multiplied by the attenuation coefficient dually, different contents will be described and a duplicate description will be omitted.

Figure 22:
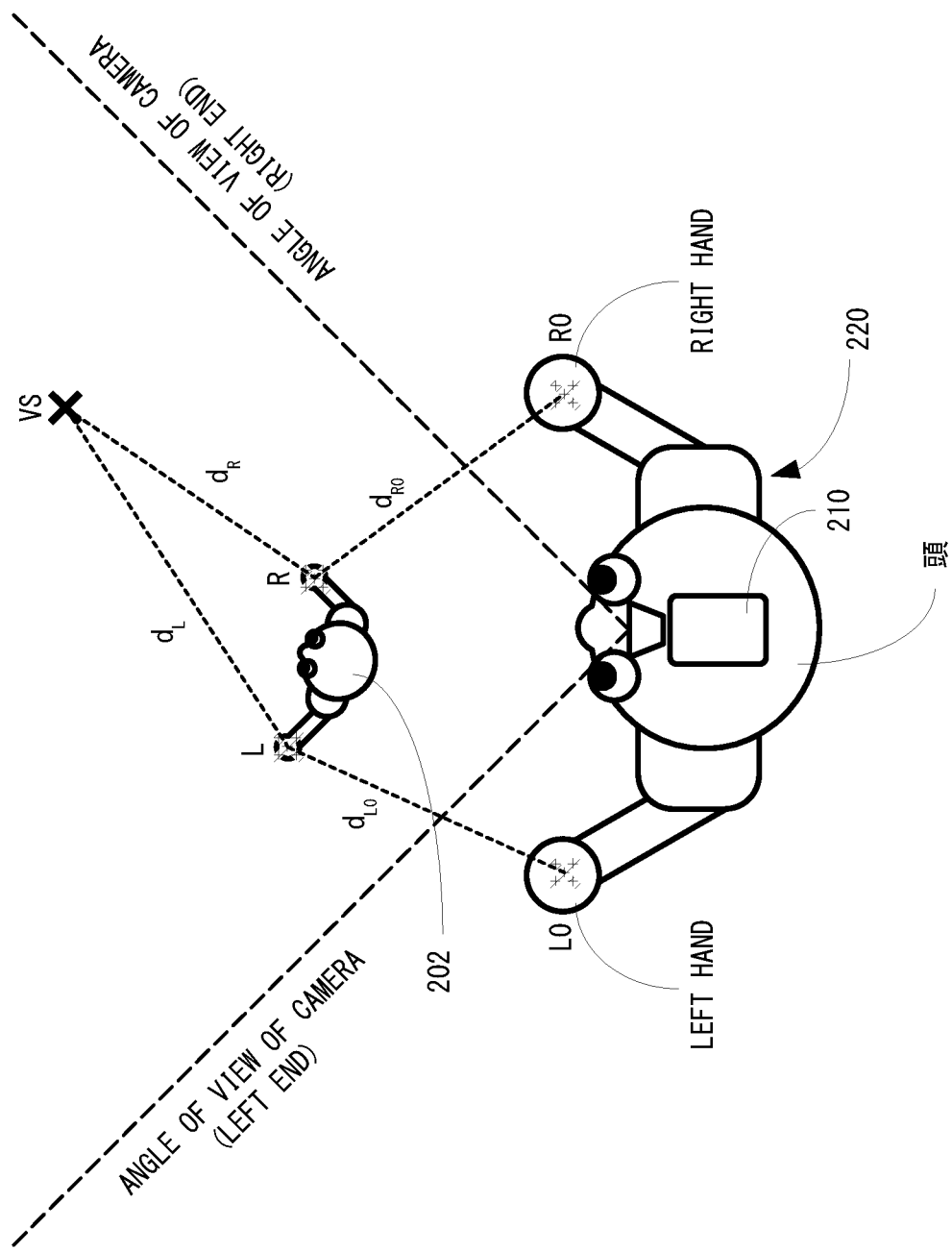
FIG. 22 is an illustration view showing a non-limiting example calculation method of vibration that is conveyed to a reception portion from a vibration source in a fourth embodiment.

As shown in FIG. 22, in the fourth embodiment, a reception portion L0 and a reception portion R0 are set in positions equivalent to the player's own a left hand and a right hand besides the reception portion L and the reception portion R. However, as to positions corresponding to the left hand and the right hand of the player are set in the following manner. A head of a virtual player 220 is arranged in a position of the virtual camera 210, and a direction of the head (face) of the virtual player 220 is set to be the same as the direction of the virtual camera 210 (line of sight). Moreover, the direction of a body of the virtual player 220 is the same as that of the head of the virtual player 220. Furthermore, the left hand of the virtual player 220 is set below the head in the diagonally left front of a body, and the right hand of the virtual player 220 is set below the head in the diagonally right front of the body.

In this fourth embodiment, the vibration to be conveyed to the reception portion L that is set on the left hand of the player object 202 is further conveyed to the reception portion L0 that is set on the left hand of the virtual player 220. The vibration data corresponding to the vibration to be conveyed to the reception portion L is calculated as in the first embodiment, and the vibration data corresponding to the vibration to be conveyed to the reception portion L0 is further calculated like the first embodiment on the assumption that the reception portion L is the vibration source VS. That is, after the vibration data corresponding to the vibration source VS is multiplied by the attenuation coefficient $c_L$ that is calculated based on the distance $d_L$ between the vibration source VS and the reception portion L, the attenuation coefficient $c_{L0}$ that is calculated based on a distance $d_{L0}$ between the reception portion L and the reception portion L0 is multiplied, whereby the left side vibration data 304j is calculated.

Similarly, the vibration to be conveyed to the reception portion R that is set on the right hand of the player object 202 is further conveyed to the reception portion R0 that is set on the right hand of the virtual player 220. The vibration data corresponding to the vibration to be conveyed to the reception portion R is calculated as in the first embodiment, and the vibration data corresponding to the vibration conveyed to the reception portion R0 is further calculated like the first embodiment on the assumption that the reception portion R is the vibration source VS. That is, after the vibration data corresponding to the vibration source VS is multiplied by the attenuation coefficient $c_R$ calculated based on the distance $d_R$ between the vibration source VS and the reception portion R, the attenuation coefficient $c_{R0}$ calculated based on a distance $d_{R0}$ between the reception portion R and the reception portion R0 is multiplied, whereby the right side vibration data 304k is calculated.

In the first mode-third mode, the vibration motor 82b is driven according to the left side vibration data 304j calculated as described above, and the vibration motor 102b is driven according to the right side vibration data 304k calculated as described above. Moreover, in the fourth mode, the vibration motor 162b is driven according to the left side vibration data 304j calculated as described above, and the vibration motor 164b is driven according to the right side vibration data 304k calculated as described above.

In addition, when the reception portion L5 and the reception portion R5 are set based on the position of the virtual camera 210 as indicated in the first embodiment, the reception portion L0 and the reception portion R0 become the same positions as the reception portion L5 and the reception portion R5, and therefore, there is no meaning in multiplying the attenuation coefficient c by two steps as described above.

In also the fourth embodiment, it is possible to present the vibration according to various situations in the virtual space, like the first embodiment. By doing as in the fourth embodiment, while expressing the vibration that is to be felt by the player object in a first-stage calculation, it is possible by a second-stage calculation to make the player feel the impression that the player himself/herself exists and operates the player object in the virtual space.

In addition, a modification of the fourth embodiment is applicable also to the third embodiment.

Moreover, although omitted in the fourth embodiment, as for a case where a plurality of vibration sources VS exist, as done in the third embodiment, the left side vibration data and the right side vibration data are calculated by synthesizing the vibration from the plurality of vibration sources VS.

In addition, although the vibration data that is input from application is data about a set of the value indicating the frequency and the voltage value indicating the amplitude in each of the embodiments, the vibration signal (vibration waveform) itself may be the vibration data as described above. In such a case, the CPU 20 incorporated in main body apparatus can generate the vibration data from the vibration signal. For example, the vibration signal is divided into segments each having a predetermined time width (for example, 5 msec.—few or several 10 msec.), and each of the segments is subjected to frequency decomposition, and then, major components are extracted out of sets of a frequency and an amplitude included in a result of the frequency decomposition, for example, and the extracted component is decided as a representative value in each of the segments. As a result, corresponding to the vibration signal, the data aggregation composed of sets each consists of a value indicating the frequency and a voltage value indicating the amplitude is obtained as vibration data. However, the data aggregation composed of sets each consists of a frequency and an amplitude may be used as the vibration data.

Moreover, although a case where the game apparatus is used in any one of the first mode-fourth mode and the two vibration portions are simultaneously driven is described in each of the above-described embodiments, but it does not need to be limited to this. For example, when using the game apparatus in the second mode, the player can use the first controller or the second controller. Moreover, when using the game apparatus in the fourth mode, unlike the third controller, there is a case where only a single vibration portion (vibration motor) is provided. In these cases, a single reception portion is set, and vibration that is to be conveyed to the reception portion from a single vibration source may be generated in the vibration portion. Moreover, the vibration that is obtained by synthesizing vibration each conveyed to a single reception portion from a plurality of vibration sources may be generated in the vibration portion.

Furthermore, although a case where the game apparatus is used in each of the first mode-fourth mode and a single player plays the game is described in each of the above-described embodiments, it does not need to be limited to this. Since eight (8) controllers are connectable to the main body apparatus 10a at the maximum, when the game apparatus is used in any one of the second mode—the fourth mode, a further controller such as a third controller may be connected so as to play (operate) an application such as a game with a plurality of players. When playing a game by a plurality of persons, a controller to be used is selected for each player. Therefore, an application program identifies the controller to be used for each player. Moreover, in this case, the application program calculates the vibration data (left side vibration data and right side vibration data) corresponding to the vibration to be conveyed to the reception portions (L, R) that are set corresponding to respective player objects that are arranged in the virtual space corresponding to the players, and instructs the operating system to generate vibration in the controller used by the player that the vibration is to be presented, and sends (inputs) the calculated left side vibration data and right side vibration data to the corresponding controller.

Moreover, although each of the above-described embodiments is described on a case where the vibration source and the reception portion are set in a three-dimensional virtual space, the vibration source and the reception portion may be provided in a two-dimensional virtual space. In this case, as shown in FIG. 12, for example, the player object 202 and the enemy object 204 are arranged in the two-dimensional virtual space so as to be viewed from above, and a two-dimensional game screen that the player object 202 and the enemy object 204 are viewed from above is displayed on the display device 12. Moreover, the vibration source VS is set in the position of the enemy object 204, the reception portion L is set in the position on the left hand of the player object 202, and the reception portion R is set in the position on the right hand of the player object 202. In also such a case, the distance $d_L$ between the vibration source VS and the reception portion L and the distance $d_R$ between the vibration source VS and the reception portion R are calculated, the vibration to be conveyed to the reception portion L from the vibration source VS is attenuated based on the distance $d_L$, and the vibration to be conveyed to the reception portion R is attenuated based on the distance $d_R$.

In addition, a specific appearance of the apparatus or device and the specific numerical values indicated in each of the above-described embodiments are mere exemplification, and can be changed suitably according to actual products. Moreover, processing of respective steps of flowchart of FIG. 17 and FIG. 18 are mere example, and if the same or similar effect (result) is obtained, an order of the steps may be exchanged.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A vibration control system including a processor operatively connected to first and second vibration actuators arranged on left and right when in use, the processor generating control signals that make the first and second vibration actuators vibrate, the processor configured to provide elements comprising:
   a vibration source arrangement portion configured to arrange a vibration source in a virtual space;
   a vibration data generation portion configured to generate vibration data corresponding to vibration that is generated from the vibration source;
   a reception portion setting portion configured to set in the virtual space first and second reception portions each configured to receive the vibration from the vibration source, the reception portion setting portion being configured to set the first and second reception portions in the virtual space corresponding to the first and second vibration actuators, respectively, the first and second reception portions being arranged corresponding to left and right of an object comprising a virtual player;
   a changing portion configured to change the vibration data that is generated by the vibration data generation portion based on a space situation between the vibration source that is arranged by the vibration source arrangement portion and the first and second reception portions that are set by the reception portion setting portion, the changing portion being configured to generate first changed vibration data obtained by changing the vibration data that is generated by the vibration data generation portion based on the space situation between the vibration source and the first reception portion, and to generate second changed vibration data obtained by changing the vibration data that is generated by the vibration data generation portion based on the space situation between the vibration source and the second reception portion; and
   a vibration control portion configured to make the vibration actuators vibrate according to the vibration data that is changed by the changing portion, the vibration control portion being configured to make the first vibration actuator vibrate according to the first changed vibration data, and to make the second vibration actuator vibrate according to the second changed vibration data;
   the reception portion setting portion being further configured to set a third reception portion other than the first and second reception portions on the virtual player, and
   the changing portion being further configured to further change the vibration data having been changed based on the space situation between the vibration source and the first and second reception portions based on a space situation between at least one of the first and second reception portions and the third reception portion.

2. The vibration control system according to claim 1, wherein the vibration source corresponds to a further object that is arranged in the virtual space.

3. The vibration control system according to claim 1, further comprising a player object arrangement portion configured to arrange in the virtual space a player object that is moved in the virtual space according to an operation of a player, wherein
   the reception portion setting portion is configured to set the first and second reception portions in relation to the player object that is arranged by the player object arrangement portion.

4. The vibration control system according to claim 3, wherein the changing portion is configured to change the vibration data according to a state of the player object.

5. The vibration control system according to claim 3, wherein the changing portion is configured to change a changing rate of the vibration data according to a state of the player object.

6. The vibration control system according to claim 1, wherein the vibration source arrangement portion is configured to arrange a plurality of vibration sources in the virtual space, and the vibration data generation portion is configured to generate the vibration data corresponding to vibration that is generated from each of the plurality of vibration sources, and the changing portion is configured to change each vibration data based on the space situation between each of the plurality of vibration sources and the first and second reception portions, further comprising a synthesizing portion configured to synthesize each changed vibration data with each other, wherein
the vibration control portion is configured to make the first and second vibration actuators vibrate based on the vibration data that is synthesized by the synthesizing portion.

7. The vibration control system according to claim 1, wherein the object is a virtual camera.

8. The vibration control system according to claim 1, wherein the changing portion is configured to change the vibration data so that a difference between the vibration that is received by the first reception portion and the vibration that is received by the second reception portion becomes large.

9. The vibration control system according to claim 1, wherein the space situation includes a medium between the vibration source and the first and second reception portions, and the changing portion is configured to change a changing rate of the vibration data according to the medium.

10. The vibration control system according to claim 1, wherein the vibration data is data about a set of values of a frequency and an amplitude of a vibration waveform, and
the changing portion is configured to change at least one of the frequency and the amplitude according to a space situation.

11. The vibration control system according to claim 10, wherein the changing portion is configured to change a changing rate of the amplitude according to a frequency.

12. A vibration control apparatus including a processor operatively connected to first and second vibration actuators arranged on left and right when in use, the processor generating control signals that make the first and second vibration actuators vibrate, the processor configured to perform operations comprising:
arrange a vibration source in a virtual space;
generate vibration data corresponding to vibration that is generated from the vibration source;
set in the virtual space first and second virtual receivers each configured to receive the vibration from the vibration source, including set the first and second virtual receivers in the virtual space corresponding to the first and second vibration actuators, respectively, and arrange the first and second virtual receivers corresponding to left and right of an object comprising a virtual player;
change the vibration data that is generated by the vibration data generation portion based on a space situation between the vibration source and the first and second virtual receivers, including generate first changed vibration data obtained by changing the generated vibration data based on the space situation between the vibration source and the first virtual receiver, and generate second changed vibration data obtained by changing the generated vibration data based on the space situation between the vibration source and the second virtual receiver; and
make the vibration actuators vibrate according to the changed vibration data, including make the first vibration actuator vibrate according to the first changed vibration data, and make the second vibration actuator vibrate according to the second changed vibration data;
set a third virtual receiver other than the first and second virtual receivers on the virtual player, and
change the vibration data having been changed based on the space situation between the vibration source and the first and second virtual receivers based on a space situation between at least one of the first and second virtual receivers and the third virtual receiver.

13. A non-transitory computer readable storage medium storing a vibration control program executable by a computer, wherein the vibration control program causes one or more processors of the computer to perform operations comprising:
arranging a vibration source in a virtual space;
generating vibration data corresponding to vibration that is generated from the vibration source;
setting in the virtual space two receivers each configured to receive the vibration from the vibration source;
changing the generated vibration data based on a space situation between the vibration source and the receivers;
making two vibration portions, configured to be arranged on left and right when in use, vibrate according to the changed vibration data;
set the two receivers in the virtual space corresponding to the two vibration portions, respectively;
generate first changed vibration data obtained by changing the generated vibration data based on the space situation between the vibration source and one of the two receivers, and generate second changed vibration data obtained by changing the generated vibration data based on the space situation between the vibration source and the other of the two receivers;
make one of the two vibration portions vibrate according to the first changed vibration data, and the other of the two vibration portions vibrate according to the second changed vibration data;
arrange the two receivers corresponding to left and right of a second object comprising a virtual player;
set a further receiver other than the two receivers on the virtual player; and
further change the already-changed vibration data based on a space situation between at least one of the first and second receivers and the further receiver.

14. The storage medium of claim 13 wherein the first vibration portion comprises a first vibration actuator, and the second vibration portion comprises a second vibration actuator.

15. A vibration control method, comprising steps of:
(a) arranging a vibration source in a virtual space;
(b) generating vibration data corresponding to vibration that is generated from the vibration source;
(c) setting in the virtual space a reception portion configured to receive the vibration from the vibration source;
(d) changing the vibration data that is generated in the step (b) based on a space situation between the vibration source that is arranged in the step (a) and the reception portion that is set in the step (c);

(e) making two vibration portions vibrate according to the vibration data that is changed by the step (d), the two vibration portions configured to be arranged on left and right when in use;

(f) set the two reception portions in the virtual space corresponding to the two vibration portions, respectively;

(g) generate first changed vibration data obtained by changing the generated vibration data based on the space situation between the vibration source and one of the two reception portions;

(h) generate second changed vibration data obtained by changing the generated vibration data based on the space situation between the vibration source and the other of the two reception portions;

(i) make one of the two vibration portions vibrate according to the first changed vibration data, and the other of the two vibration portions vibrate according to the second changed vibration data;

(j) arranging the two reception portions corresponding to left and right of a second object, wherein the second object is a virtual player, (k) set a further reception portion other than the two reception portions on the virtual player; and (l) further change the vibration data having been changed based on the space situation between the vibration source and the reception portion based on a space situation between the reception portion and the further reception portion.

16. The vibration control method of claim 15 wherein the first vibration portion comprises a first vibration actuator that vibrates a player's left hand, and the second vibration portion comprises a second vibration actuator that vibrates the player's right hand, and the first, second and third reception portions comprise virtual receivers.

* * * * *